United States Patent [19]

Hone et al.

[10] Patent No.: US 6,330,726 B1
[45] Date of Patent: Dec. 18, 2001

(54) GANGWAY SYSTEM

(75) Inventors: George Dean Hone, Roy; Glen Orval West, West Haven; Eric Peter Beazer, Ogden, all of UT (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/506,964

(22) Filed: Feb. 18, 2000

(51) Int. Cl.[7] .................. E01D 19/04; E01D 1/00
(52) U.S. Cl. ................ 14/71.5; 14/71.3; 14/69.5
(58) Field of Search ................ 14/69.5, 71.1, 14/71.3, 71.5, 71.7, 72.5; 114/230.1, 230.17

(56) References Cited

U.S. PATENT DOCUMENTS

| | | | |
|---|---|---|---|
| 2,875,457 | * | 3/1959 | Read et al. ............ 14/71.5 |
| 3,110,048 | * | 11/1963 | Bolton ............... 14/71.5 |
| 3,683,440 | * | 8/1972 | Xenakis et al. ........ 14/71.5 |
| 4,157,742 | * | 6/1979 | Aanensen ............. 182/97 |
| 4,161,049 | * | 7/1979 | Saunders et al. ....... 14/71.5 |
| 4,335,803 | | 6/1982 | Sugita . |
| 4,369,538 | * | 1/1983 | Smedal .............. 14/69.5 |
| 5,084,936 | * | 2/1992 | Thomas, Jr. .......... 14/71.5 |
| 5,226,204 | | 7/1993 | Schoenberger et al. . |
| 5,524,318 | * | 6/1996 | Thomas .............. 14/72.5 |
| 5,791,003 | | 8/1998 | Streeter et al. . |
| 5,950,266 | * | 9/1999 | Streeter et al. ....... 14/69.5 |

* cited by examiner

Primary Examiner—Thomas B. Will
Assistant Examiner—Gary S. Hartmann
(74) Attorney, Agent, or Firm—TraskBritt, PC

(57) ABSTRACT

A bridge for the transfer of passengers between an elevated level of a terminal building has a vestibule attached to the terminal building. A first bridge unit extends from the vestibule to a rotunda assembly and is rotatably attached to the rotunda assembly and the vestibule. The rotunda assembly has an elevation system for changing the slope of the first bridge unit relative to the horizontal. A second bridge unit extends from the rotunda assembly and has a bubble attached at its outer end. The second bridge unit has telescoping sections and is movable vertically, telescopically and radially upon operation of a driving system connected at the outer end of the second bridge unit. A telescoping brow extends away from the second bridge unit. The slopes of the first bridge unit and the second bridge unit are controlled to be less than 12 percent with the bubble being movable over a wide range of locations and with a substantial range of vertical motion.

31 Claims, 17 Drawing Sheets

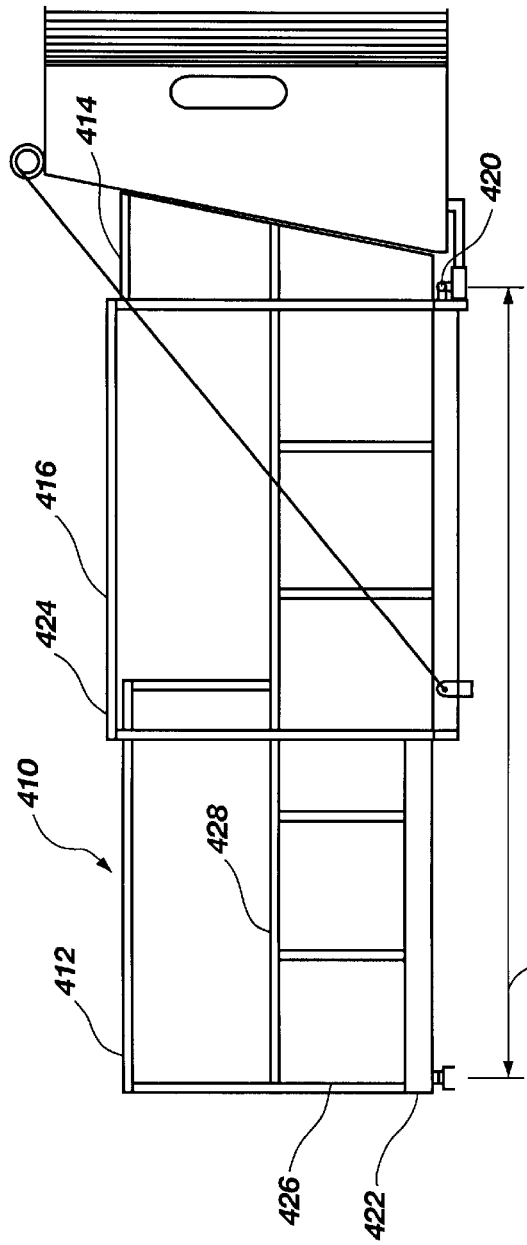
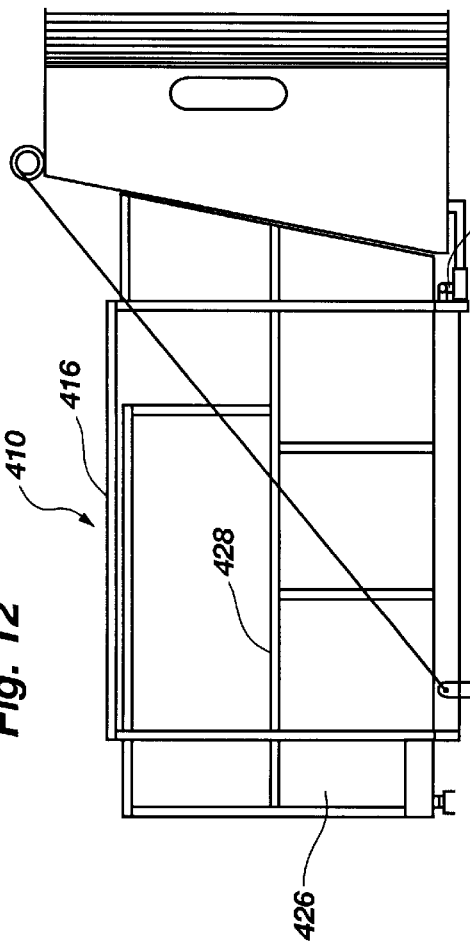
Fig. 12
Fig. 13

GANGWAY SYSTEM

BACKGROUND OF THE INVENTION

1. Field

This invention relates to movable bridge systems for transferring passengers and cargo between a building or structure and a movable vehicle and, more particularly, to a movable bridge or gangway system for transferring passengers and cargo between a ship and a pier facility.

2. State of the Art

Passenger boarding or loading bridges or platforms are known to connect to a terminal structure and extend outwardly for connection to a vehicle. Such devices or structures maybe found at airports servicing large jet airplanes. Commercial units can be purchased from the Jetway Systems group of FMC Corporation located in Odgen, Utah. The bridge connects to the terminal and extends away toward the airplane. The bridge typically has a mechanism near its end that allows the outward end to be extended telescopically and to be moved radially as well as vertically to service or connect to airplanes having doors at differing heights and locations as well as to adjust to the location of an airplane that may not be parked where desired to facilitate connection with the bridge.

Bridges for transferring passengers are known to have telescoping sections as seen in U.S. Pat. No. 5,226,204 (Schoenberger et al.) and U.S. Pat. No. 5,761,757 (Mitchell et al.). Wheel arrangements are associated with the outward end to allow an operator to reposition the outward end, causing the telescoping sections to move relative to each other as needed. Radial movement of the outward end of a passenger bridge is also shown in U.S. Pat. No. 4,319,376 (Saunders) and U.S. Pat. No. 4,161,049 (Saunders et al.).

Passenger transfer for vehicles that include ships involves structure to interconnect between the vehicle and a stationary transfer location. For example, ships move up and down relative to a pier with the tides and as the ship or vessel is loaded. Ships may change position along the pier not only with the tide but also based on wind and wave action and as a result of wakes from other vessels passing nearby. Also ships and vessels may vary in size and configuration so that the transfer point for passengers is widely disparate.

Cruise ships as a class involve the transfer of large numbers of passengers. Cruise ships may also have different transfer points or areas for passengers. The transfer points may be at different heights and at different locations along the length of the ship. Traditional brow or gangway systems have been found to be insufficient or inadequate because they may have stairs such as those seen in U.S. Pat. No. 4,335,803 (Sugita).

U.S. Pat. No. 5,791,003 (Streeter et al.) discloses a system having a single bridge or platform for transferring passengers between a terminal building with multiple levels and a ship. The bridge or platform is moved from one level of the terminal to another to control the angle of the walkway or tunnel for the transfer of passengers between the terminal and a ship. Thus, the Streeter et al. arrangement requires a terminal to have multiple levels which could require duplication of facilities in the terminal. Further, the terminal must be relatively close to the edge of the pier and, in turn, the ship because the length of an unsupported walkway or tunnel is limited.

SUMMARY OF THE INVENTION

A bridge system is provided for movement of passengers and baggage or cargo between a location at a passenger terminal having multiple levels and a passenger transfer location on a vehicle such as a ship. The passenger transfer location on the vehicle varies in height between a first level and a second level spaced above the first. The passenger terminal has multiple levels with the bridge system connected at an elevated level above the ground.

The bridge system includes a vestibule for attachment to the elevated level of the passenger terminal. The vestibule has a vestibule transport surface extending away from the passenger terminal which is positionable for the transfer of passengers between the vestibule transport surface and the elevated level of the terminal.

A first bridge unit has a first end and a second end. The first bridge unit is rotatably attached to the vestibule proximate the first end thereof. The first bridge unit is rotatable to a selected one of a plurality of first bridge unit positions. The first bridge unit has a first transport surface extending substantially between said first end and said second end. The first end of the first transport surface is positioned proximate the vestibule transport surface for the transfer of passengers between said first transport surface and said vestibule transport surface.

The second end of said first bridge unit is rotatably attached to a rotunda assembly. The rotunda assembly has a rotunda transport surface positioned for the transfer of passengers between said first transport surface and said rotunda transport surface. Elevation means is attached to the rotunda assembly for moving the rotunda assembly to one of a plurality of rotunda positions relative to and above the ground level.

A second bridge unit also has a first end and a second end. The first end of the second bridge unit is rotatably attached to the rotunda assembly. Therefore, the second bridge unit may move to a selected one of a plurality of positions relative to the horizontal. The second bridge unit has a second transport surface extending substantially between the first end and the second end thereof. The second transport surface is positioned for the transfer of passengers between the rotunda transport surface and the second transport surface.

Driving means is positioned proximate the second end of said second bridge unit for moving the second end of said second bridge unit to a selected one of a plurality of positions between a lower position and an elevated position above ground level. The driving means may also be operated for moving the second bridge unit radially and telescopically about the rotunda assembly.

The bridge system also includes brow means for transferring passengers between the second bridge unit and the vehicle. The brow means has a first end and a second end with a brow transport surface extending substantially therebetween. The first end of the brow means is connected proximate the second end of the second bridge unit for the transfer of passengers between the second transport surface and the brow transport surface. The second end of the brow means is configured to contact the vehicle proximate a passenger transfer location for the transfer of passengers between the brow transport surface and the vehicle.

The elevation means of the rotunda assembly is operable to move the rotunda assembly vertically and, in turn, cause the first bridge unit to move relative to the vestibule. The driving means is operable for radially moving the rotunda assembly and for moving the second bridge unit telescopically and vertically. Movement of the rotunda assembly vertically and the driving means (vertically, radially and telescopically) is effected to position the second end of the brow means at the passenger transfer location while maintaining the angles of inclination of the passenger transport surfaces as desired.

Preferably, the first level is the ground level proximate the terminal. The vestibule desirably has a vertical support extending from a support surface such as the ground level to the vestibule. The vertical support is positioned to vertically support the vestibule. Even more preferably, the vestibule support surface is substantially horizontal.

In a preferred arrangement, the first bridge unit rotates about a first pivot proximate the vestibule between a first bridge unit first position in which the first transport surface is at a first angle to extend downwardly below horizontal to a first bridge unit second position in which the first transport surface is at a second angle to extend upwardly above horizontal.

It is also preferred that the elevation means be operable to move the rotunda assembly between a rotunda assembly first position in which the first bridge unit is in its first bridge unit first position and a rotunda assembly second position in which the first bridge unit is at its first bridge unit second position.

Desirably, the first angle and the second angle are each selected to provide for an inclination and a declination from about 0 to about 12 percent. Even more preferably, the first angle and the second angle are each selected to provide for an inclination and a declination from about 0 to about 10 percent. It is most preferred to provide for an inclination or declination from about 0 to about 8.33 percent.

In an alternate configuration, the rotunda assembly has a fixed portion and a rotating portion connected together. A first portal is connected to the fixed portion of the rotunda assembly with the second end of the first bridge unit rotatably attached proximate the fixed portion. The rotunda assembly has the rotunda assembly transport surface extending between and into the rotating portion and the fixed portion. The rotating portion has a second portal and is configured for radial movement of the second portal relative to said first portal. Preferably, the rotunda assembly is configured for the movement of the second portal rotationally about a vertical axis relative to the first portal between a first rotated position toward the first bridge unit and a second rotated position away from the first bridge unit.

The second bridge unit also is rotatable horizontally between a second bridge unit first position in which the second transport surface extends downwardly at a third angle below the horizontal and a second bridge unit second position in which the second transport surface extends upwardly at a fourth angle above the horizontal. Desirably, the third angle and the fourth angle are each selected to provide for an inclination and a declination from about 0 to about 12 percent. Even more desirably, the third angle and the fourth angle are each selected to provide for an inclination and a declination from about 0 to about 10 percent and, most desirably, from about 0 to about 8.33 percent.

The driving means alternately includes vertical movement structure for moving the second end of said second bridge unit between the second bridge unit first position and the second bridge unit second position. The driving means may also include horizontal movement structure for moving the second bridge unit radially between a first radial position and a second radial position and telescopically inward and outward from the rotunda assembly. Preferably, the driving means is operable to move the second bridge unit radially relative to the rotunda assembly between the first radial position and the second radial position. The first radial position may be at any orientation relative to the rotunda assembly with the second radial position being from about 90 degrees to about 180 degrees from the first radial position.

The bridge system preferably includes a brow rotunda assembly referred to as a bubble with a bubble transport surface positioned for the transfer of passengers between the second transport surface and the rotunda assembly transport surface and for the transfer of passengers between the bubble transport surface and the brow transport surface. The bubble has a fixed section with a bridge portal attached thereto having the second end of the second bridge unit rotatably secured proximate thereto. The bubble has a rotating section which is sometimes referred to as a cab that is connected to the fixed section to rotate relative thereto. Preferably, the bubble includes a brow portal attached to the rotating section with the brow means attached to the bubble proximate the brow portal.

In a more preferred arrangement, the second bridge unit includes a first telescoping section and a second telescoping section connected to the first telescoping section for telescoping movement therebetween. The horizontal movement structure is operable to move the first telescoping section relative to the second telescoping section to vary the length of the second bridge unit.

The second bridge unit also may include a third telescoping section connected to the second telescoping section for telescoping movement therebetween. The horizontal movement structure is operable to move the third telescoping section relative to the second telescoping section. The brow means may also include a first section and a second section connected to telescope together. The first section of the brow means has a first end and a second end, and the second section of the brow means has a first end and a second end. The first end of the first section of the brow means is rotatably connected to the rotating section of the bubble, and the second end of the first section is telescopically connected to the first end of the second section of the brow. The second end of the second section is configured for placement at the passenger transfer position on or at the vehicle.

Preferably, the driving means is attached to the second bridge unit and, more specifically, to the third telescoping section to be spaced axially away from the bubble. Also more preferably, the horizontal movement structure is attached to the vertical movement structure.

In an alternate and desired configuration, the vestibule, the first bridge unit, the rotunda assembly, the second bridge unit, the bubble and the cab are each provided with a roof. Even more desirably, the vestibule, the first bridge unit, the rotunda assembly, the second bridge unit, the bubble and the cab each have sidewalls. The brow may also be provided with a roof, sidewalls and hand rails.

The brow is most preferably rotatably attached to the cab to be movable about a third pivot between a fifth angle below the horizontal and a sixth angle above the horizontal. In some arrangements, the first angle and the second angle are each selected to provide for an inclination and a declination from about 0 to about 12 percent.

In at least one arrangement, the second end of the brow is configured for attachment to the vehicle. The vehicle may be a ship.

BRIEF DESCRIPTION OF THE DRAWINGS

In the drawings, which illustrate what is presently regarded as the best modes for carrying out the invention:

FIGS. 12 and 13 depict different positions of an alternate form of brow means for use with the bridge of the present invention;

DESCRIPTION OF THE ILLUSTRATED EMBODIMENTS

Figure 1:
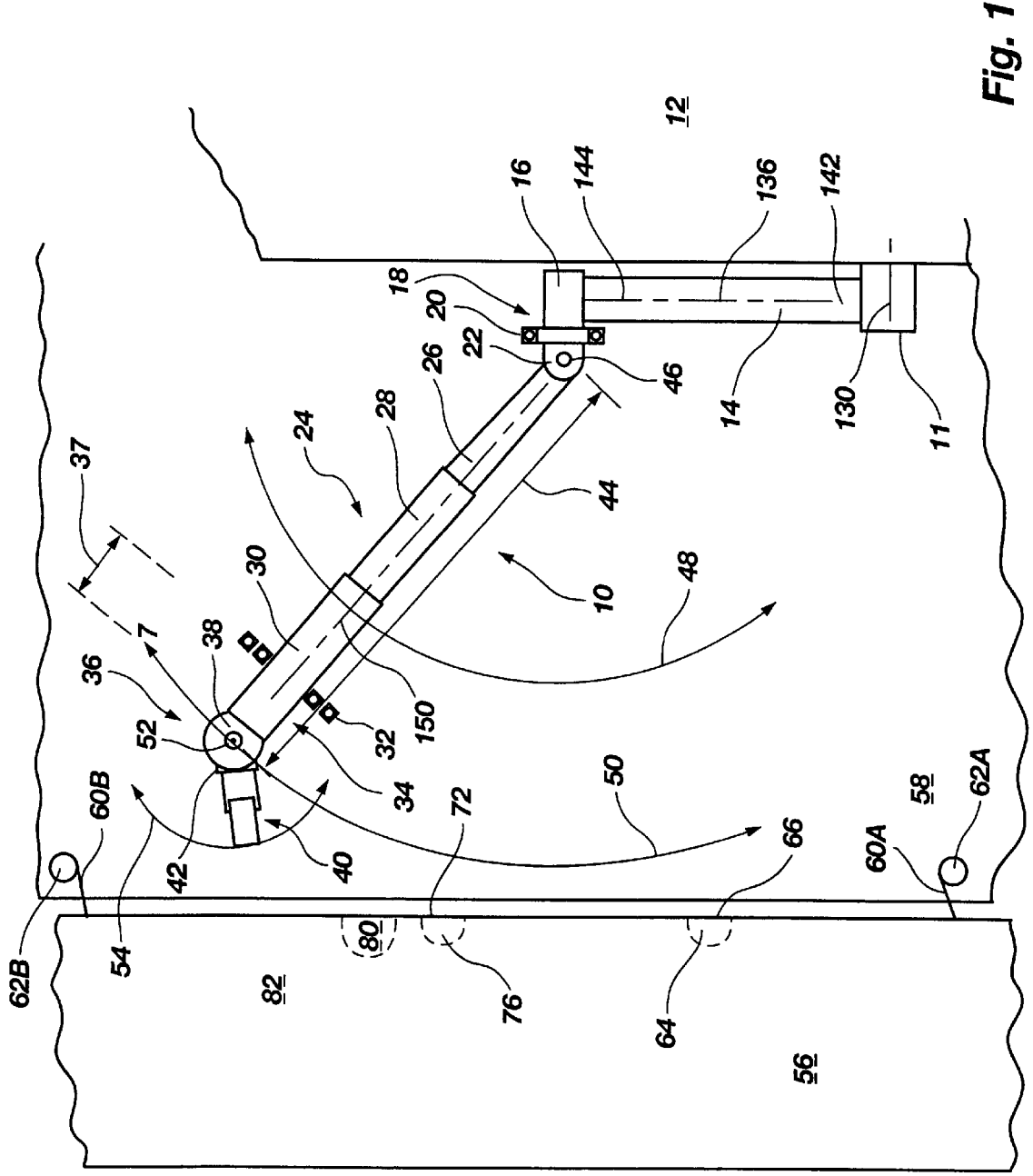
FIG. 1 is a top view of a bridge of the present invention attached to a terminal and positioned proximate a ship.

The bridge 10 depicted in FIG. 1 has a vestibule 11 connected to and extending away from a terminal building 12 (also referred to as "terminal 12"). A first bridge unit 14 is connected to the vestibule 11 to rotate relative to the horizontal as more fully discussed hereinafter. The first bridge unit 14 extends to and connects to a fixed portion 16 of rotunda 18. The rotunda 18 is attached to elevation means, which is here shown as an elevation system 20 described in more detail hereafter.

The rotunda 18 has a rotating portion 22 connected to the fixed portion 16. A second bridge unit 24 is connected to the rotating portion 22 to extend away therefrom. The second bridge unit 24 is shown having a first telescoping section 26 connected to telescope relative to a second telescoping section 28. A third telescoping section 30 is shown connected to telescope relative to the second telescoping section 28. The telescoping sections 26, 28 and 30 form what may be referred to as a passenger tunnel.

Driving means such as driving system 32 is attached proximate the outer or second end 34 of the second bridge unit 24. The driving system 32 operates to change the elevation of the outer end 34 relative to the rotunda 18 and also to move the second end 34 radially and axially relative to the rotunda 18 and the first bridge unit 14 as further described below.

The driving system 32 is spaced away from the fixed portion 16 of a bubble 36 a distance 37 selected (e.g., about 10 feet) so that the driving system 32 acts as a fulcrum for the bubble 36 to increase the range of motion for the bubble 36 with a change in the elevation of the driving system 32. The bubble 36 has a roof 38 attached at the second end 34 of the second bridge unit 24. A gangway or brow 40 is attached to the cab 42, which is itself attached to rotate about the bubble 36.

As depicted in FIG. 1, the second bridge unit 24 telescopes to change or vary its length 44. At the same time, the second bridge unit 24 may be rotated 48 and 50 about the axis 46 of the rotating portion 22 of the rotunda 18. Telescoping in length 44 and rotation 48 and 50 is effected by operation of the driving system 32 as discussed later in more detail. The brow 40 is also shown to be rotatable 54 about the axis of rotation 52 of the cab 42 attached to rotate about the bubble 36.

In FIG. 1, it can be seen that the bridge 10 is operated to extend between the terminal 12 and the ship 56 moored to pier 58 by mooring lines 60A and 60B secured to bollards 62A and 62B respectively. The pier 58 may be any type or kind of pier, dock, quay or other structure suitable for mooring ships thereto. The ship 56, as illustrated, is not intended to depict a particular kind or type. Rather, the ship 56 may be any vessel of the type that is configured to embark and disembark a quantity of passengers and cargo from a transfer point or position. Although passenger transfer is the principal function, the same structure may be used for crew and for cargo, such as baggage, that is typically or preferably moved by hand, by hand truck or hand cart. The bridge 10 may be suitable for transferring passengers and cargo between a pier and oceangoing vessels as well as a pier, dock or quay and large river boats and lake vessels such as may be found on major rivers and on major lakes such as the Great Lakes. In effect, the ship 56 represents any vessel that is sized to receive a quantity of passengers and at the same time have a passenger transfer area at a height that may vary from below the level of the pier 58 to a height substantially above the pier 58. Although the bridge 10 is configured for transferring large numbers of passengers, such as may be found with large cruise ships having a passenger capability approaching 5000, the bridge 10 certainly can be used to transfer between ships or suitably large boats and, of course, to transfer between a dock/pier and vessels not intended to carry passengers.

Figure 2:
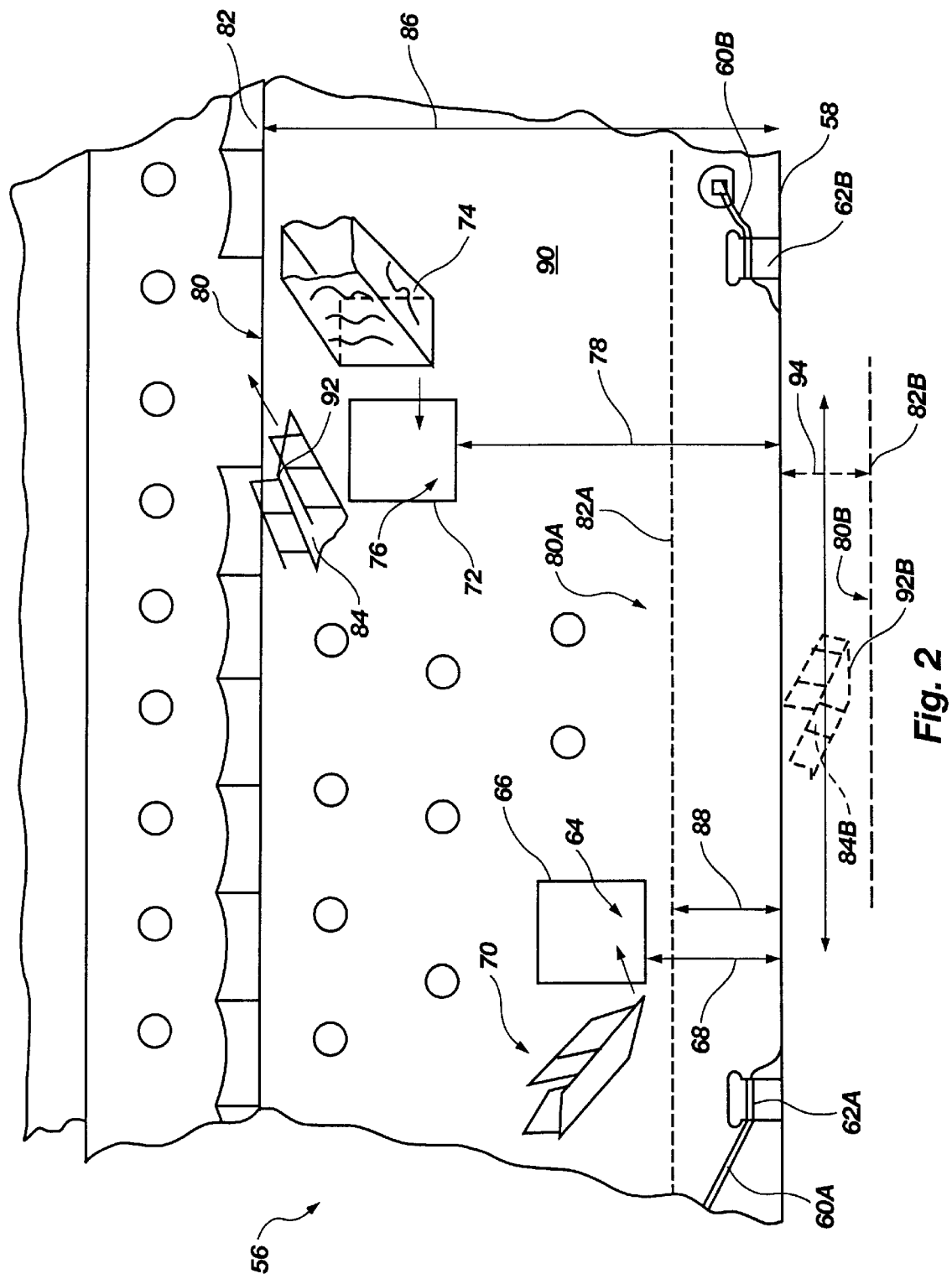
FIG. 2 is a side view of a ship with portions of the present invention depicted relative thereto.

For example, as best seen in FIG. 2, a first passenger transfer location or area 64 of ship 56 is within the transfer port 66 positioned at a height 68 above the pier 58. A brow 70 associated with a bridge such as bridge 10 is shown directed toward the transfer port 66 and the first passenger transfer area 64. A second transfer port 72 is shown with a brow 74 of a bridge such as bridge 10 directed at a second passenger transfer area 76. The second transfer port 72 is positioned at a height 78 above the pier 58. A third passenger transfer area 80 is located on an open deck 82. A brow 84, associated with a bridge such as bridge 10, is shown directed toward the third passenger transfer area 80. The deck 82 is located at height 86 above the pier 58.

Notably the heights 68, 78 and 86 above the pier 58 are all different. Although not shown to any scale, the difference in the heights 68, 78 and 86 above the pier 58 may be significant and as much as 30 to 40 feet. Further, the heights 68, 78 and 86 above the pier 58 may all change together as the ship 56 moves up and down relative to the pier 58 with tides and with the movement of cargo, water, fuel and other materials thereon and thereoff. Indeed, relative movement between the ship 56 and the pier 58 can be induced by the wake of passing vessels, wind, tides, currents, ballasting changes and the like. The bridge 10 must, therefore, have a vertical range of motion so that the outer end of a brow (e.g., brow 84) is positionable at a height 86 comparable to the highest transfer area 80 and a height of the lowest transfer area. That is, the deck 82 could move quite substantially to a new location 82A at height 88 or even location 82B at a height 94 below the level of the pier 58 so that the transfer area 80B is below the level of the pier 58. With the transfer area 80B below the level of the pier 58, the brow, such as brow 84B shown in phantom, angles downwardly so that the outer end 92B is positionable on the deck location 82B. In other words, it can be seen that the ship 56 has a side or hull 90 that may vary in height so that the passenger transfer area on the ship 56 may vary from below the level of the pier 58 to well above the pier 58. The bridge 10 of the present invention is configured to accommodate a wide range of heights and locations at which the passenger transfer area or location may be found while maintaining angles of inclination of passenger transport surfaces close to or within those acceptable for persons suffering a physical impairment.

It should be understood that the ship 56 illustrated in FIGS. 1 and 2 is but one form of vehicle that may be serviced by the bridge. Other vehicles including barges, yachts, airplanes and the like may all be found to be suitably served by a bridge 10 having the features here described.

Figure 3:
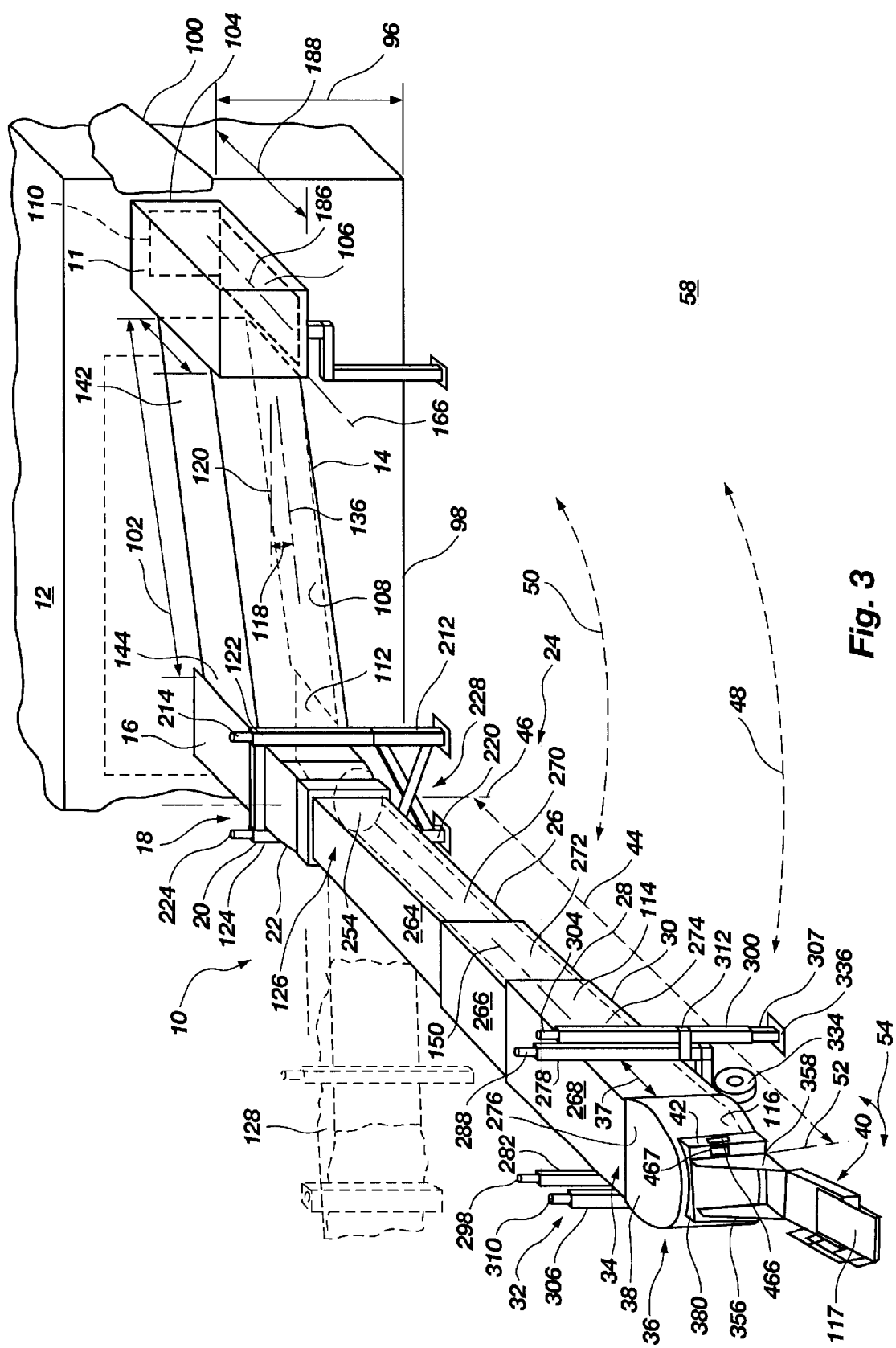
FIG. 3 is a perspective view depicting the bridge of the present invention.

Turning now to FIG. 3, the bridge 10 is depicted in perspective with the vestibule 11 attached to the terminal 12 at a height 96 above the ground level 98, which is here shown as the level of the pier 58. It should be understood, however, that the ground level of the terminal may be different from the level of the pier 58 and may be above or below the level of the pier 58. Of course, if the terminal 12 is constructed on the pier 58 and the pier 58 is elevated above water, the term "ground level" is one of convenience inasmuch as the terminal would not be constructed or positioned on or over ground.

The terminal 12 has multiple levels including a ground level 98 and an elevated level 100. As shown in FIG. 3, the terminal 12 is a two-story building with the ground level 98 being the ground floor and the elevated level 100 being the second floor. The vestibule 11 is shown connected to the terminal 12 to transfer passengers and cargo between the vestibule 11 and the elevated level 100 or second floor. The elevated level 100 may be at some other level or height 96 above the pier 58 including at a higher floor level. The height 96 is selected by the length 102 of the first bridge unit 14 and the maximum downward angle of the first bridge unit 14 discussed hereinafter in reference to FIG. 4. The height 96 is further selected by the maximum vertical range of motion of the brow 40 and more specifically the bubble 36.

Embarking passengers may arrive and proceed into the terminal 12 and to the elevated level 100 for movement onto the ship 56 through the bridge 10 by accessing the bridge 10 at the location 104. The terminal 12 is a structure selected for processing passengers and, in some cases, cargo such as baggage. Counters, elevators, escalators, ramps, walls and the like may be provided to regulate the flow of passengers and their baggage as they arrive to board the ship 56. Debarking passengers may similarly process through the terminal 12 by exiting the bridge 10 at location 104 and then proceeding to other areas in or near the terminal 12 to recover baggage and to proceed to areas to access other modes of transportation.

Passengers transfer between location 104 on the elevated level 100 and the vestibule transport surface 106 through a terminal access 110. The vestibule transport surface 106 and the first bridge unit transport surface 108 are positioned proximate each other for transfer of cargo and passengers between the first bridge unit 14 and the vestibule 11. Similarly, the first bridge unit 14 and the fixed portion 16 of the rotunda 18 are connected so that the rotunda transport surface 112 and the first bridge unit transport surface 108 are positioned proximate each other for the transfer of passengers and cargo therebetween. Of course, the second bridge unit 24 has a second bridge unit 14 positioned proximate the rotunda transport surface 112 and the bubble transport surface 116 also for the transfer of passengers therebetween.

As can be seen in FIG. 3, the rotunda 18 has an elevation system 20 for moving the rotunda 18 up and down relative to the ground level 98, which is here the same as the level of the pier 58, to change the angle of inclination 118 relative to the horizontal 120 of the first bridge unit 14. The elevation system 20 is here shown to include a first leg 122 and a second leg 124 as more fully discussed hereinafter. The second bridge unit 24 in turn has an inward end 126 that thereby moves in elevation with the rotunda 18. The outer end 34 of the second bridge unit 24 moves in elevation, along axis 150 and radially by operation of the driving system 32 as discussed more fully below. Movement in elevation can be seen in reference to a portion 128 of the second bridge unit 24 shown in phantom.

Figure 4:
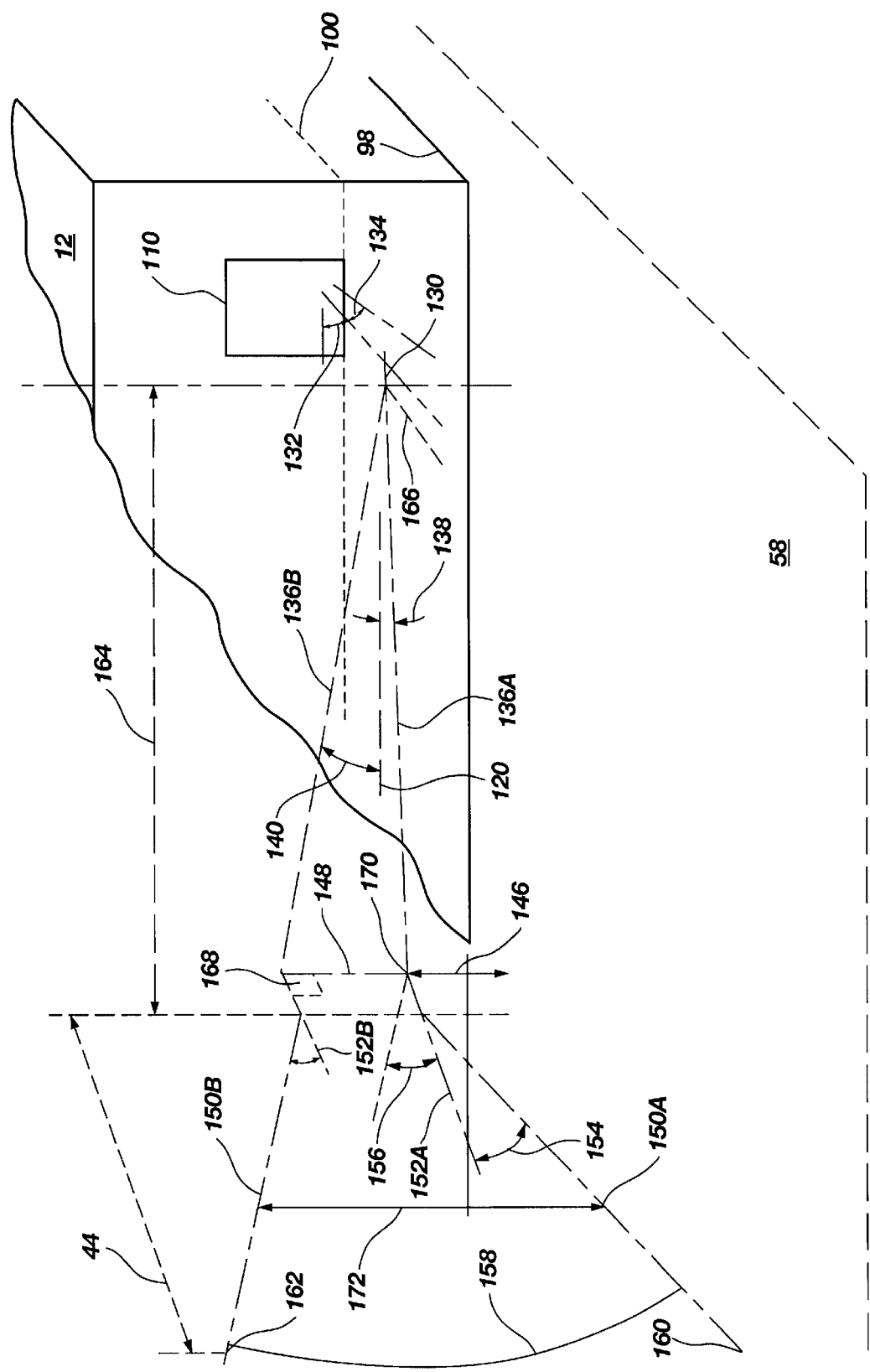
FIG. 4 is a diagram illustrating the geometry of the bridge of FIG. 3.

Referring to FIG. 4, the terminal access 110 is shown with a vestibule axis 130 shown extending away from the elevated level 100 substantially horizontally. The vestibule axis 130 may be angulated relative to the elevated level 100 at an angle 132 or 134 based on the arrangement. The vestibule axis 130 is preferably essentially horizontal or level. The first bridge unit 14 has a longitudinal axis 136 (FIG. 3) and is movably mounted to the vestibule 11 proximate its first end 142 to move relative to the horizontal 120 to vary the inclination of the first bridge unit 14 upon a change in the height of the rotunda 18. At the same time, the inward end 126 of the second bridge unit 24 changes to in turn vary the slope of the second bridge unit 24. More specifically, the first bridge unit 14 is movable between one position in which its axis 136 (FIG. 3) is in position 136A (FIG. 4) extending downwardly from the horizontal 120 at a first angle 138 and another position in which its axis 136 (FIG. 3) is in position 136B (FIG. 4) extending upwardly from the horizontal 120 at a second angle 140.

The second end 144 of the first bridge unit 14 is therefore movable in elevation between a first level at height 146 and a second level at height 146 plus height 148. As noted, the change in height or elevation of the second end 144 is effected by operation of the elevation system 20 as discussed below.

As further seen in FIG. 4, the second bridge unit 24 is rotatably attached to the rotunda 18 proximate its inward end 126 to rotate relative to the horizontal 152A and 152B to in turn vary the inclination of the second bridge unit 24 and, in turn, the elevation of the bubble 36. More specifically, the second bridge unit 24 is movable between one position in which its axis 150 (FIG. 3) is in position 150A extending downwardly from the horizontal 152A at a third angle 154 and another position in which its axis 150 is in position 150B extending upwardly from the horizontal 152 at a fourth angle 156. Because the rotunda 18 and, in turn, the first or inward end 126 of the second bridge unit 24 may move to any position along height 148, it can be seen that the second or outer end 34 (FIG. 1) of the second bridge unit 24 and, in turn, the bubble 36 has a range of motion 158 between a lower position 160 and an upper position 162. The range of motion 158 may be as much as 30 feet measured from the dock level or the level of the pier 58.

As noted herein, the second bridge unit 24 is adjustable in length 44, which in turn adjusts the location of the lower position 160 and the upper position 162 (and all positions in between) of the outward end 34 and the bubble 36 horizontally relative to the terminal 12 and more specifically the rotunda 18. Adjusting the length 44 may also control the range of vertical locations of the outer end 34 or the bubble 36. That is, the range of motion 158 will decrease to a smaller range of motion 172 as the second bridge unit 24 is shortened in length.

The length 102 of the first bridge unit 14 and, in turn, the distance 164 between the vertical axis 46 of the rotating portion 22 of the rotunda 18 and the axis of rotation 166 (FIG. 3) controls the height 148 or distance between the upper position 168 and the lower position 170 of the second end 144 of the first bridge unit 14. This, in turn, impacts on the range of positions available at the inward end 126 of the second bridge unit 24 and, in turn, the range of motion 158 for the outer end 34 of the second bridge unit 24 and the bubble 36.

The angles 138, 140, 154 and 156 are selected to provide a slope for the first bridge unit transport surface 108 and the second bridge unit transport surface 114 to a maximum of about 12 percent. That is, for about every 12 inches in length 102 and 44, the transport surfaces 108 and 114 change vertically no more than about 1.44 inches. Thus, the first bridge unit transport surface 108 may slope up or down so that the longitudinal axis 136 has the desired slope. Similarly, the second bridge unit transport surface 114 may slope up or down so that the axis 150 has the desired slope. A vertical change of 1.5 inches for every foot in length yields a 12.5 percent slope. The user is able to select the slope by operation of the elevation system 20 and the driving system 32. Desirably, the user may operate the elevation system 20 and the driving system 32 to maintain the slope of both the first bridge unit transport surface 108 and the second bridge unit transport surface 114 at or less than 8.33 percent or at or less than 1 inch of vertical change for every 12 inches of length 102 and 44.

Figure 5:
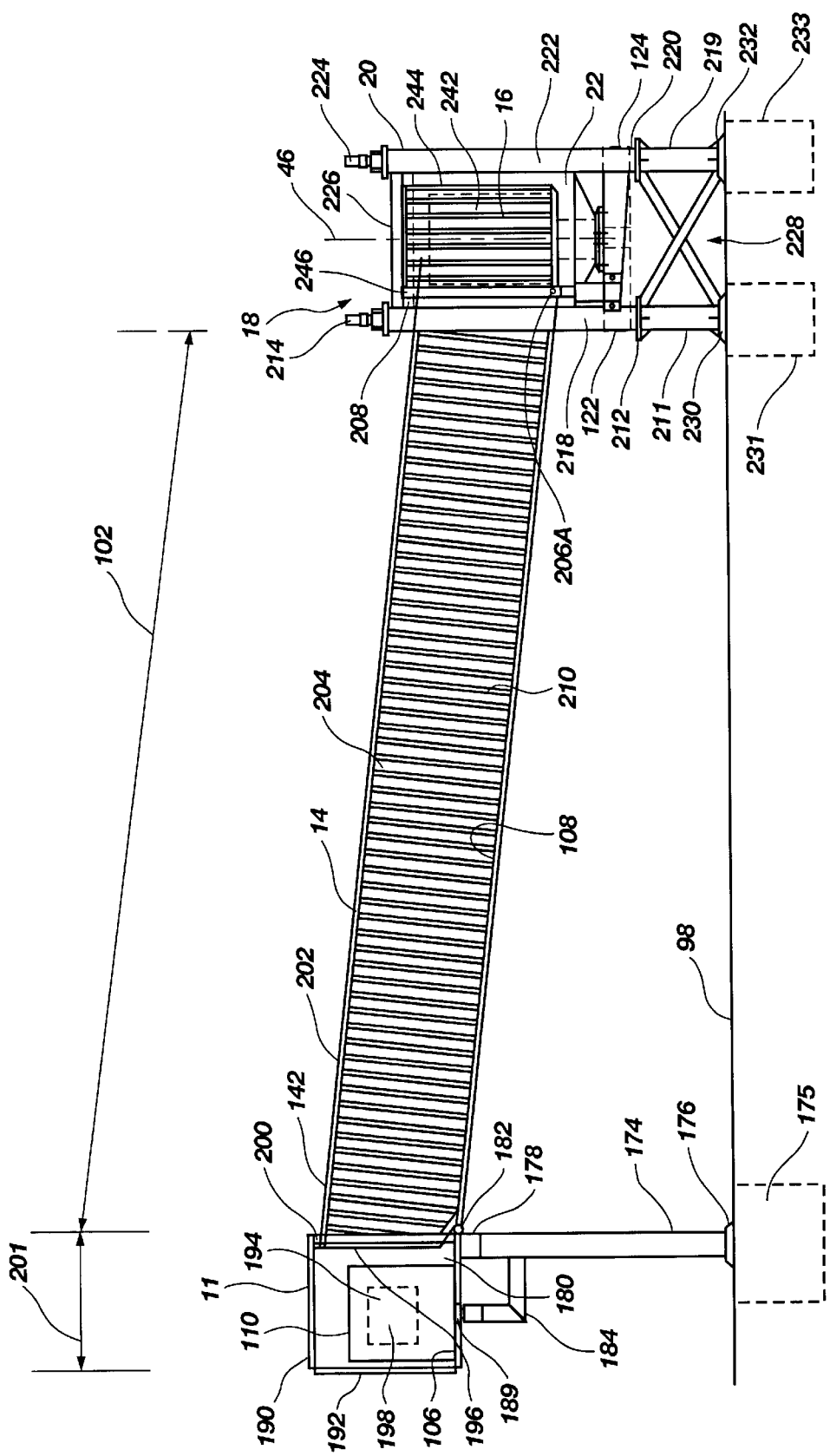
FIG. 5 is a side view of portions of the bridge of FIG. 3 including the vestibule, the first bridge unit and the rotunda with its associated elevation means.
Figure 18:
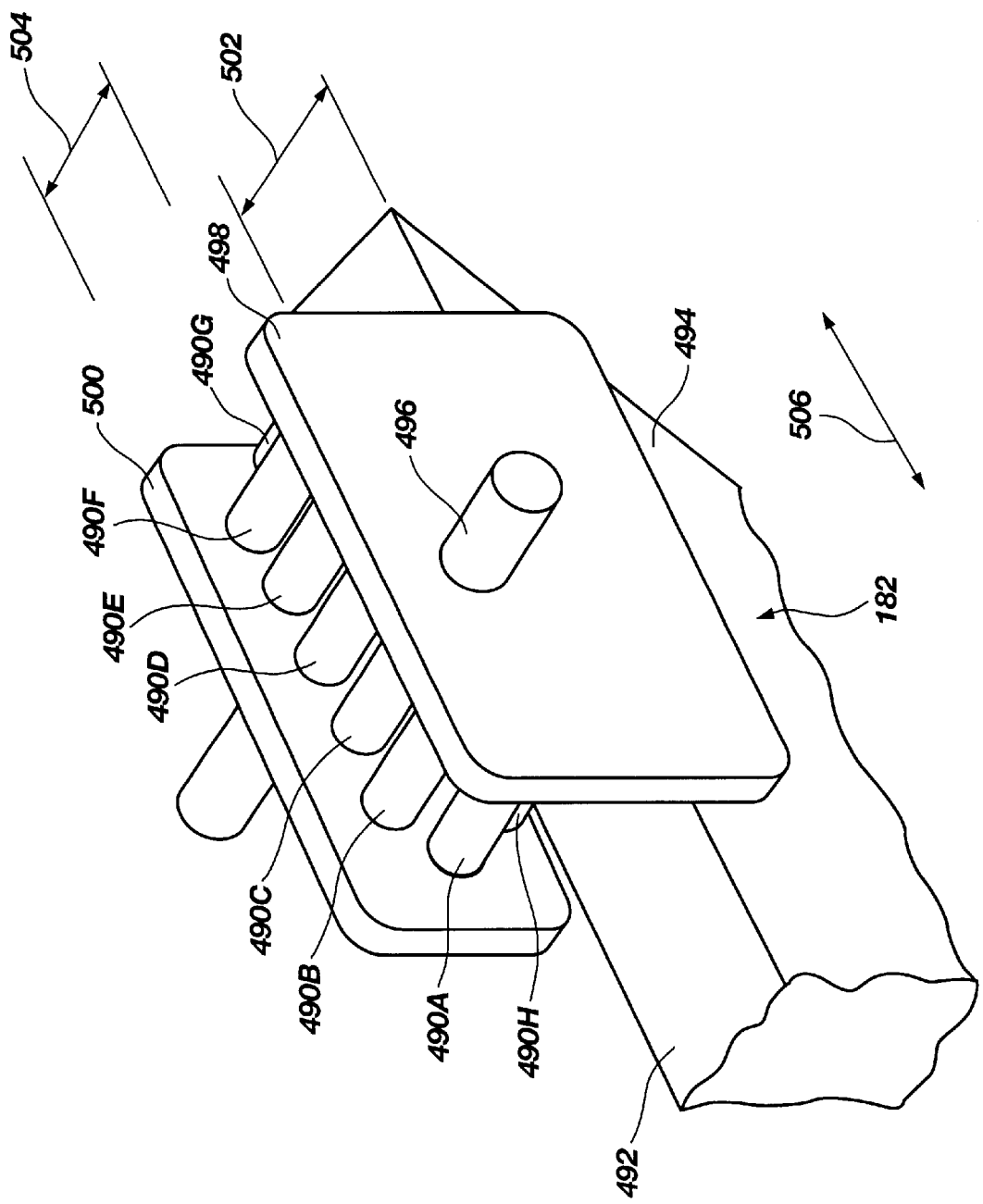
FIG. 18 is a perspective of a bearing for use with a first bridge unit of the present invention.

FIG. 5 is a side view of the vestibule 11, first bridge unit 14 and rotunda 18. The vestibule 11 is shown supported by a fixed support post 174 which has a foot plate 176 positioned at the ground level 98 on a footing 175 which may be any suitable structure or arrangement capable of supporting the vestibule 11 and related structures. The upper end 178 of the post 174 is positioned to support the vestibule 11 proximate an edge 180 of the vestibule 11 and proximate the roller 182 about which the first end 142 of the first bridge unit 14 rotates. As better seen in FIGS. 14 and 18, the roller 182 has a plurality of roller members such as roller members 490 A–H. The roller members including roller members 490 A–H extend in a pattern around the side members 498 and 500 much like the wheels inside the tracks of a tank or a bulldozer. A suitable roller modified to be comparable to that shown in FIG. 18 can be obtained from Hilman Rollers, 12 Timber Lane, Marlboro, N.J.

The bottom roller members such as roller member 490 H ride on a support surface 492 that extends outwardly from the upper end 178 of the post 174 and has a triangular support 494. The roller 182 has an axle 496 that extends outwardly from both sides 498 and 500.

Figure 14:
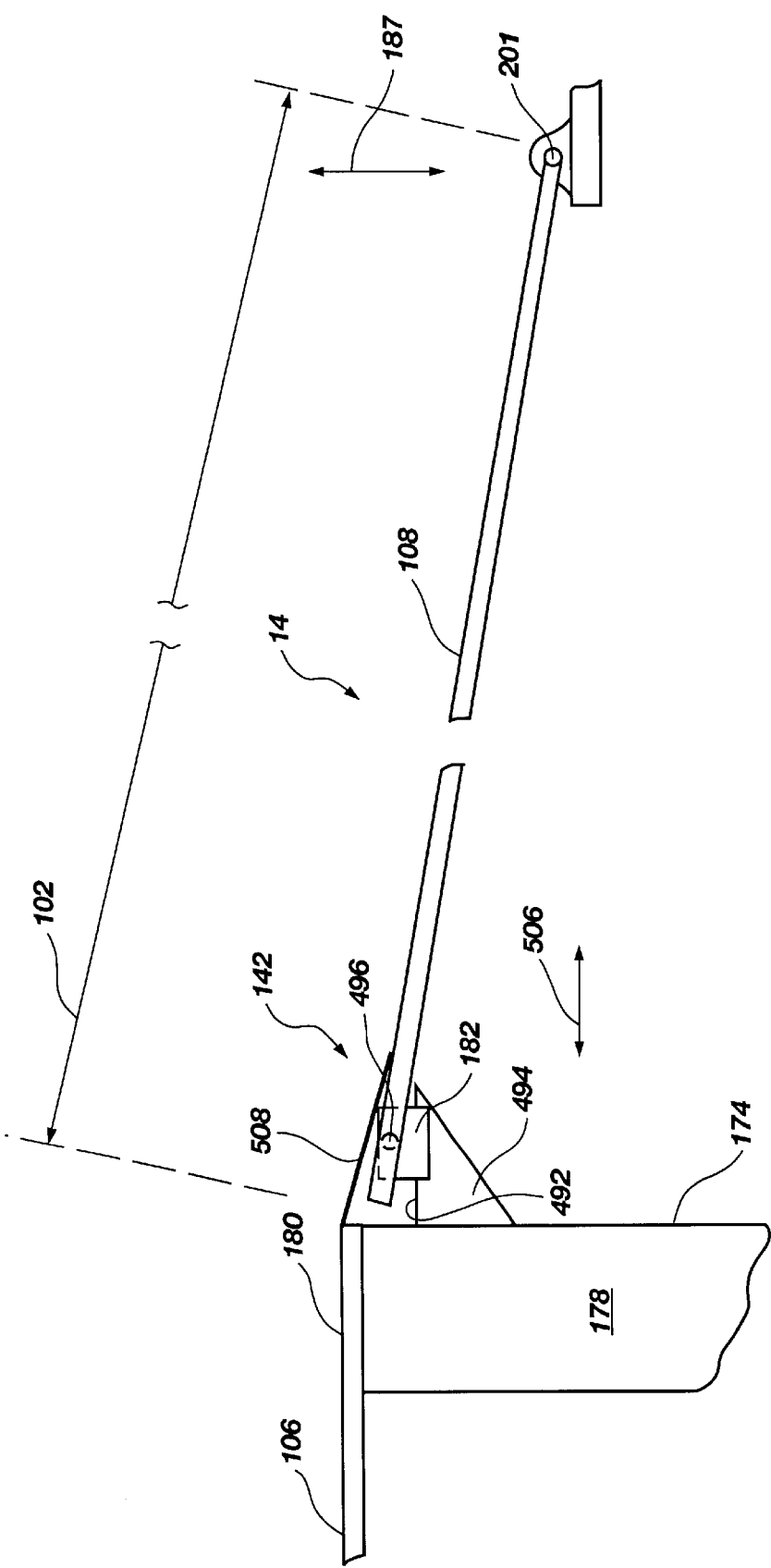
FIG. 14 is a simplified partial side view of the first bridge unit.

The support surface 492 has a width 502 which is slightly less than the distance 504 between the sides 498 and 500. The sides 498 and 500 extend below the roller members like member 490 H to act as a guide as the roller 182 moves back and forth 506 a distance that may vary from about 3 inches to about 5 inches. The transport surface 108 of the first bridge unit 14 is supported on the axle and may move rotationally as well as back and forth 506 relative to the vestibule 11 and more particularly to edge 180 as the rotunda 18 moves up and down 187. Because the pivot 206A and its companion 206B (FIG. 6B) are fixed to move in a vertical plane (up and down 187) and the length 102 of the first bridge unit 14 is fixed, the first end 142 of first bridge unit 142 must be configured with a device such as roller 182 to allow for back and forth movement 506. In FIG. 14, a treadle 508 is shown which provides for a smooth surface between the vestibule transport surface 106 and the transport surface 108 of the first bridge unit 14.

A support arm 184 is attached to the post 174 and is sized and shaped for positioning centrally under the vestibule 11. That is, it is positioned at about a midpoint 186 along the length 188 (FIG. 3) of the vestibule 11 and at a midpoint 189 (FIG. 5) along the width 201 of the vestibule 11. The support arm 184 supports and stabilizes the vestibule 11. The vestibule 11 is provided with a roof 190 as well as sides, 194 and 196 to provide an enclosed and weather-resistant structure. A window 198 may be formed in one or more of the sides 192 and 194 if desired. An opening or vestibule portal 200 is formed in one side 196 sized to movably receive the first bridge unit 14 as it rotates about roller 182 and moves back and forth 506 with roller 182.

The vestibule transport surface 106 can be seen positioned proximate the first bridge unit transport surface 108 for the transfer of passengers between the transport surface 108 of the first bridge unit 14 and the vestibule transport surface 106. A treadle 508 (FIG. 14) may be used to provide a smooth surface for ease in moving passengers and cargo.

The first bridge unit 14 is also shown with a roof 202 and is enclosed with sides such as side 204. The first bridge unit 14 is rotatably secured by pivots 206A and 206B to the fixed portion 16 of the rotunda 18. The fixed portion 16 has a first bridge port 208 through which the first bridge unit 14 extends. The first bridge port 208 is sized to rotatably receive the second end 144 of the first bridge unit 14. In FIG. 5, the side 204 is shown with corrugations 210 along the length 102 of the first bridge unit 14. However, the corrugations 210 are not shown about the first leg 122 so the leg 122 may be seen with clarity.

Figure 6A:
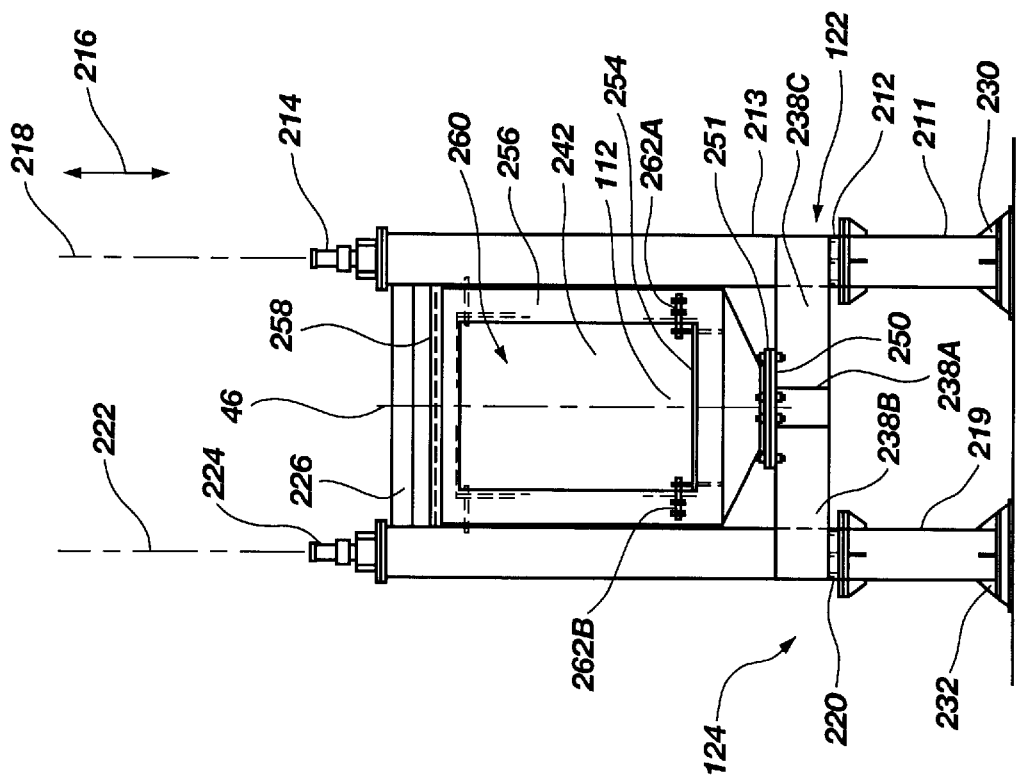
FIG. 6A is a cross-sectional view of the rotunda of FIG. 3 and FIG. 5.
Figure 6B:
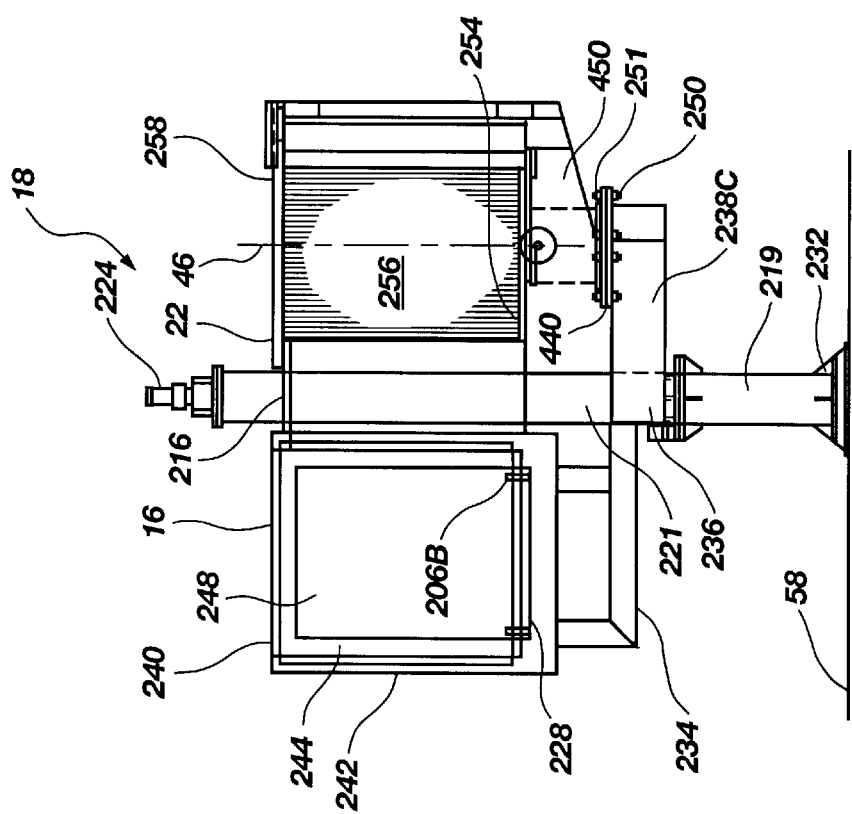
FIG. 6B is a front view of the rotunda of FIG. 6A.

As seen better in FIGS. 6A and 6B, the rotunda 18 is supported by legs 122 and 124. The leg 122 has an inner leg 212 which telescopes into outer column 213 to move relative thereto by operation of a motor 214 connected to a screw mechanism not shown. The inner leg 212 is mounted to a fixed pedestal 211. By operation of the motor 214 and the screw mechanism, the leg 122 may be changed in height or extension because the outer column 213 may be moved upwardly and downwardly 216 along axis 218 over the inner leg 212. Similarly, an inner leg 220 telescopes within outer column 221 of leg 124 so that the outer column 221 may be moved upwardly and downwardly 216 along axis 222 by operation of the motor 224 connected to a ball screw mechanism also not shown. The inner leg 212 is positioned on a pedestal 219. A cross support 226 is attached to both legs 122 and 124. The fixed portion 16 and the rotating portion 22 of rotunda 18 connected thereto may be moved upwardly and downwardly 216 by operation of the motors 214 and 224. That is, the rotunda 18 may be moved between a lower position, shown in FIGS. 5, 6A and 6B spaced above pier 58, to an elevated position, not shown in FIGS. 5, 6A and 6B but depicted in FIG. 4 with the axis 136 (FIG. 3) in position 136B. The pedestals 211 and 219 are held together and stabilized by a cross beam support arrangement 228 shown best in FIG. 5. The pedestals 211 and 219 are supported on foot plates 230 and 232, which, in turn, are supported by underground footings or comparable support structure 231 and 233. Controls are preferably placed inside the cab 42 for access by a user to operate the motors 214 and 224 to vary the height of the rotunda 18 and, in turn, the second end 144 of the first bridge unit 14. Operation of the controls can cause the slope of the first bridge unit transport surface 108 to be varied to that desired by the user from about 12 percent above to about 12 percent below the horizontal 120 (FIG. 3).

As seen in FIGS. 6A and 6B, the fixed portion 16 of the rotunda 18 is supported by a brace 234 positioned thereunder and attached to a lower cross support 236. The fixed portion 16 has a roof 240 with sides 242, 244 and 246 to provide an enclosed structure. A second end port 248 is formed in side 246 to rotatably receive the second end 144 of the first bridge unit 14 with the first transport surface 108 positioned proximate and preferably abutting the rotunda transport surface 112 to facilitate passenger transfer therebetween.

The rotating portion 22 of the rotunda 18 is supported by beams 238A, 238B and 238C upon which support flange 250 is attached by welding or a similar mechanical attachment. A base flange 251 is attached to the support flange 250 by bolts or other sufficient means to ensure a secure attachment. A post 253 is attached to the base flange 251 by welding or some other suitable means. As better shown in FIGS. 15 and 16, the post 253 is a hollow metal cylinder or pipe that extends upwardly from the base flange 251. In one embodiment, the post 253 is a 28 inch diameter pipe.

A rotating hub 440 is cylindrical in shape and sized to fit over but spaced from the post 253 to rotate thereabout. In a preferred arrangement, the hub 440 is a 30 inch diameter pipe. A circular brass bearing 442 is attached to the hub 440 near its top 441 to extend around its perimeter. The brass bearing 442 is sized to fit into a groove 443 machined into the top end of the post 253. The brass bearing 442 is positioned to contact the wall 445 of the groove 443 and, in turn, stabilize the hub 440 as it rotates about the post 253.

An "L" shaped (in cross section) bearing 444 preferably made of brass encircles the post 253 near the lower end of the post 253 and is snugly fitted thereto. The rotating hub 440 has a lip 446 about its lower end 448. The lip 446 is sized to be supported by and to rotate on the bearing 444 as shown.

A torque box 450 is attached by welding or other similar means to the rotating hub 440 to extend away a distance 452. The box 450 has sides 450A–F (FIG. 15) which are metal plates welded together. The several sections of the second bridge unit 24 transmit torque through the torque box 450 to the support flange 250. The subfloor 447 (FIG. 16) is attached to the post 253 by a bolt arrangement that allows for the subfloor 447 and in turn the floor 254 to be leveled. Specifically, a suitable plurality of studs (e.g., 4–8) such as studs 451 and 453 are welded to or threaded through and bolted to the post 253 to extend upwardly through suitable apertures in the subfloor 447 with nuts 455 and 457 threaded thereon. The nuts 455 and 457 are threaded onto the studs to snugly abut the subfloor 447. A plurality of adjustment bolts (e.g., 4–6) such as adjustment bolts 459 and 461 are threaded through the subfloor 447 to abut the top of the post 253. With nuts 455 and 457 loosened, selected adjustment bolts like bolts 459 and 461 may be operated to level the subfloor 447 and, in turn, the floor 254 of the rotunda 18. An access plate 463 is formed on the floor 254 to permit access to the bolts such as bolts 459 and 461 as well as to the nuts of the several studs such as nuts 455 and 457.

Figure 15:
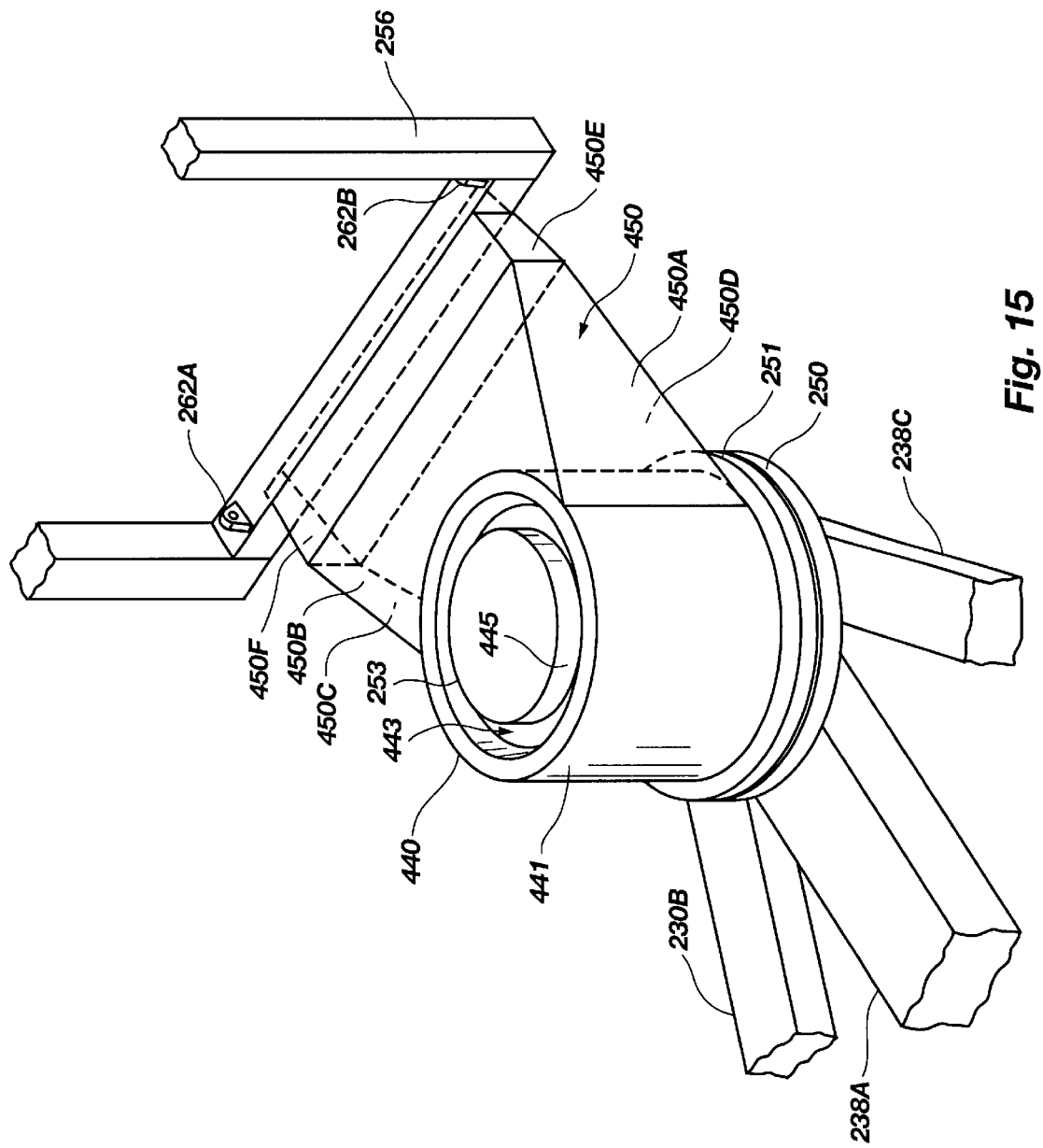
FIG. 15 is a partial perspective of portions of the rotating rotunda for use with the bridge of the present invention.
Figure 16:
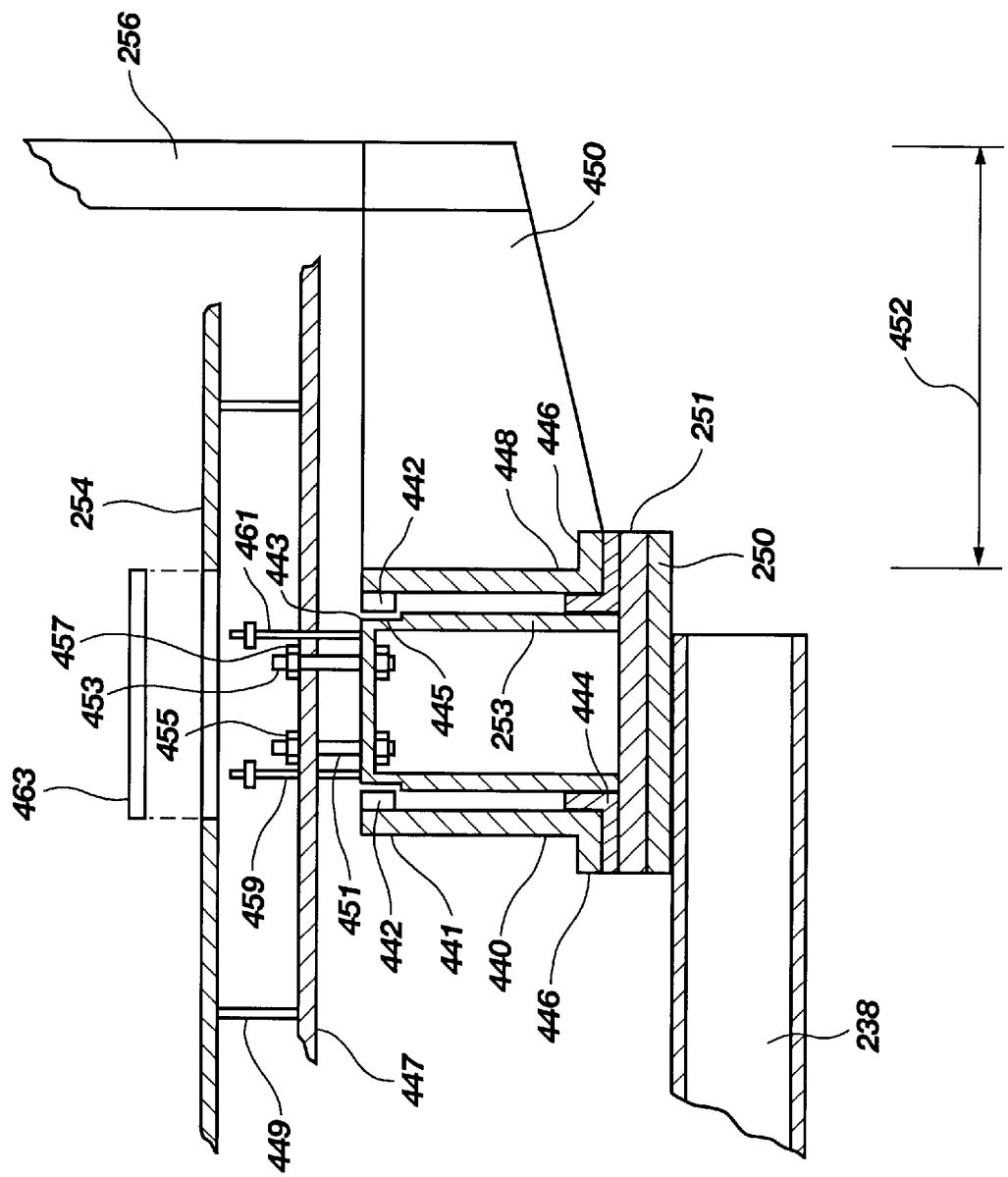
FIG. 16 is a partial cross-sectional view of portions of the rotating rotunda for use with the bridge of the present invention.

As can be seen best in FIG. 15, the torque box 450 has the door frame 256 attached to extend upwardly therefrom. The inward end 126 of the second bridge unit 24 extends into the door frame 256 and is attached thereto to rotate about the pivots 262A and 262B (FIG. 6A). A roof 258 is attached to the frame 256, both of which rotate relative to the floor 254.

The second bridge unit 24 has sections 26, 28 and 30 (FIG. 3) conventionally arranged for telescopic movement relative to each other. Each section 26, 28 and 30 is provided with a roof 264, 266 and 268 respectively along with sides such as sides 270, 272 and 274 respectively. Although the sections 26, 28 and 30 may be open, the walls and ceiling or roof are preferably provided to form an enclosed passageway with the second bridge unit transport surface 114 as the floor.

Figure 7:
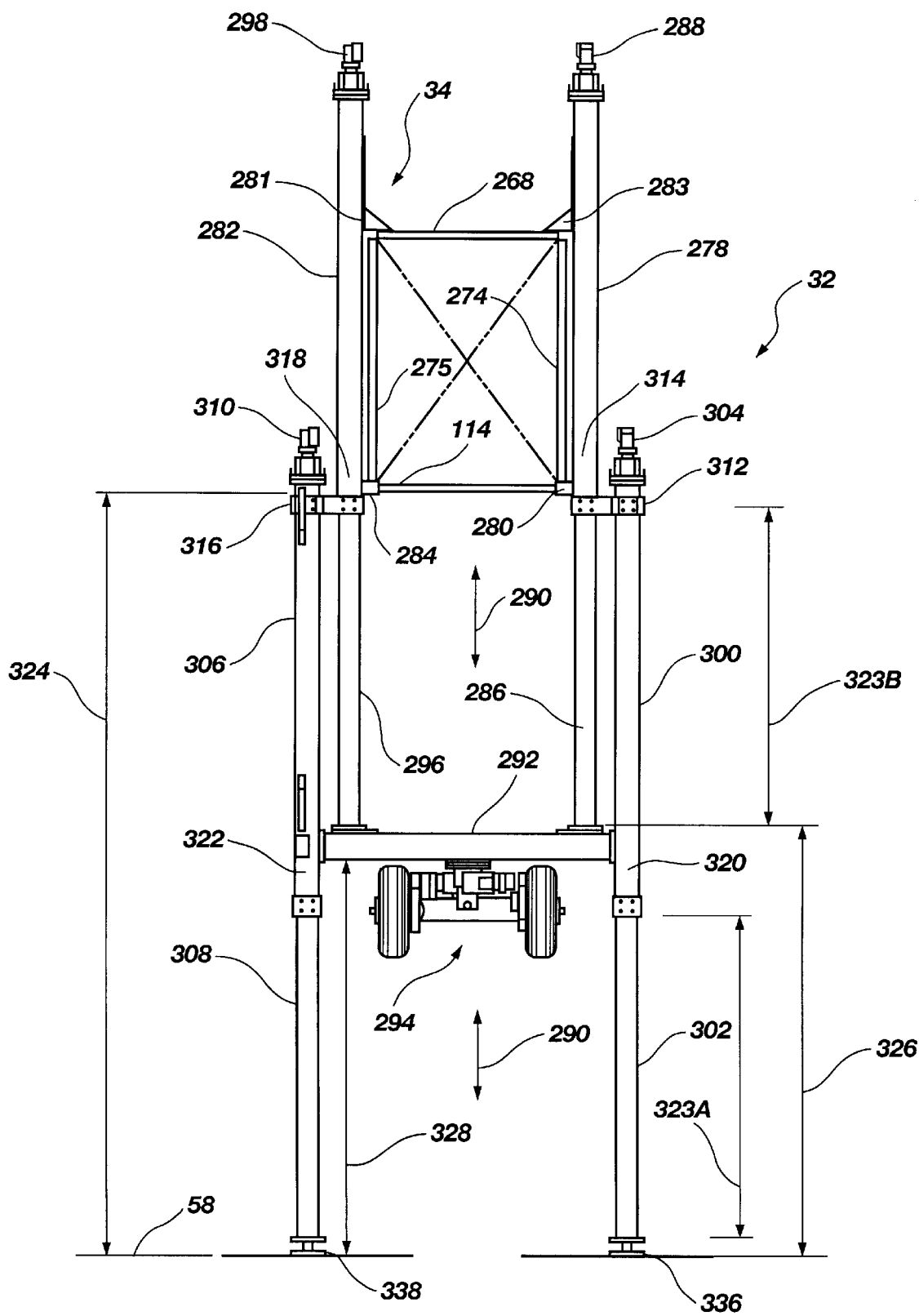
FIGS. 7 and 8 are front views of a driving means of the bridge of the present invention in different positions.
Figure 8:
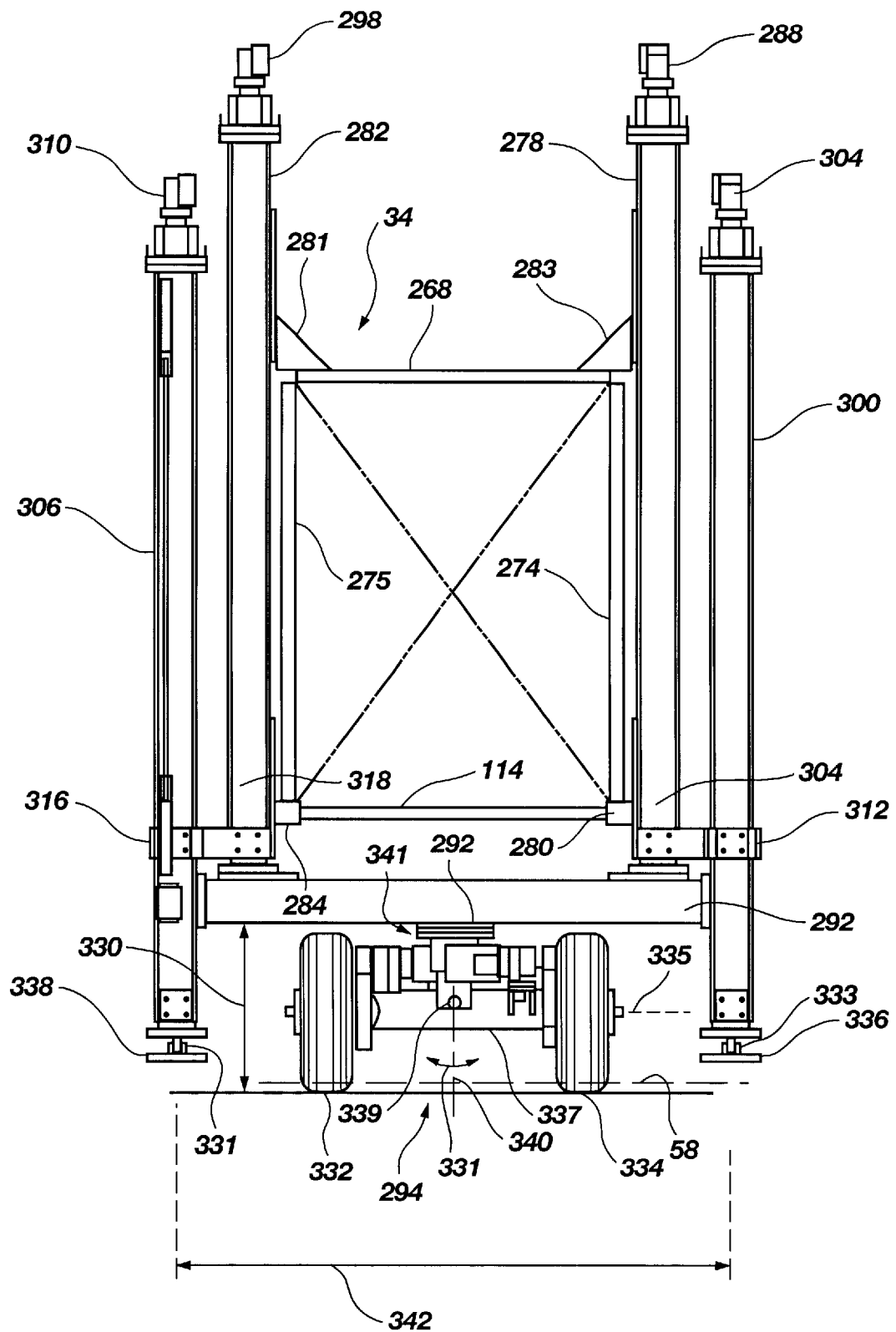

As seen in FIGS. 7 and 8, the outer end 34 of the second bridge unit 24 is secured to leg 278 of the driving system 32 by a connector 280 and to leg 282 by connector 284. It is also secured to the legs 278 and 282 by connectors 281 and 283 respectively. Leg 278 has an inner leg 286 telescopically associated and movable by a motor 288 connected to operate a ball screw mechanism to raise and lower 290 the inner leg 286 and, in turn, the beam 292 and the wheel mechanism 294 connected thereto. In a similar fashion, the inner leg 296 telescopes into and out of leg 282 by operation of motor 298. In turn, the wheel mechanism 294 may be raised and lowered 290 as desired by the user.

The driving system 32 also includes a right outrigger or right outer support leg 300 with an inner support leg 302 sized to telescope into the outer support leg 300 upon operation of the motor 304 and a ball screw mechanism not shown. Similarly, a left outrigger or a left outer support leg 306 has an inner support leg 308 that telescopes into and out of the left outer support leg 306 upon operation of the motor 310.

The right outer support leg 300 is attached to the leg 278 by a collar 312 fixedly secured to the leg 278 proximate the bottom 314 of the leg 278 and slidably and snugly connected to the right outer support leg 300. Similarly, the left outer support leg 306 is secured by a collar 316 fixedly attached to the leg 282 proximate the bottom 318 thereof and snugly and slidably connected to the left outer support leg 306. The beam 292 is fixedly secured to the lower portions 320 and 322 of right outer support leg 300 and left outer support leg 306 respectively. Thus, upon simultaneous operation of the motors 288 and 298, the legs 278 and 282 will move upwardly and downwardly 290 relative to the inner legs 286 and 296 respectively. In turn, the second bridge unit transport surface 114 may be moved between height 324 and height 326 relative to a preselected height 328 of the beam 292.

Simultaneous operation of the motors 304 and 310 will cause the right outer support leg 300 and the left outer support leg 306 to move relative to the inner support legs 302 and 308 respectively. In turn, the height of the beam 292 may vary from the height 328 (FIG. 7) to the height 330 (FIG. 8). At height 330, the wheels 332 and 334 are in contact with a support surface, such as the pier 58, because the motors 304 and 310 have moved the legs 302 and 308 respectively relative to the right outer support leg 300 and left outer support leg 306 so that the support flanges 336 and 338 are raised above the support surface such as pier 58. In turn, the wheels 332 and 334 can be operated or driven to move the second end 34 of the second bridge unit 14 outwardly and inwardly and radially to position the second end 34 of the second bridge unit 24, the bubble 36 and, in turn, the cab 42 and the brow 40 as desired.

The right outer support leg 300 and the left outer support leg 306 provide not only an additional distance to the range of motion 158, 172 (FIG. 4), but also provide stable support for the second end 34 of the second bridge unit 24 and the bubble 36. The wheel mechanism 294 is configured to act as a universal joint. With the axis of rotation 335 of the wheels 332 and 334 functioning as one axis of a universal joint. A beam 337 interconnects the wheels 332 and 334 with a pin 339 extending through the beam 337 in an appropriate bearing to provide for another axis of rotation 331 normal to axes 335.

It can also be seen that the second end 34 is supported by beam 292 through two bearing plates 341 which rotate relative to each other about the axis 340. In turn, there are three axes of rotation, all perpendicular to each other, so that the wheel mechanism 294 functions as a universal joint. In turn, the wheel mechanism 294 allows the outer support legs 300 and 306 as well as legs 278 and 282 to tilt relative to the vertical as the second end 34 is moved in elevation when the outer support legs 300 and 306 are not in contact with the pier 58 or any suitable support surface.

The outer support legs 300 and 306 have support flanges 336 and 338, each attached to their respective outer support legs 300 and 306 by a universal or ball joint 331 and 333. Because the legs 278 and 282 are fixedly secured to the outer end 34, they will tilt relative to the vertical as the outer end 34 is raised. In turn, the outer support legs 300 and 306 may tilt relative to the vertical when the outer end 34 of the second bridge unit 24 is supported by the outer support legs 300 and 306 and the outer end 34 is moved in elevation by simultaneous operation of the motors 288 and 298. The universal or ball joints 331 and 333 allow for a stable footing even though the outer support legs 300 and 306 are tilted.

Inasmuch as the wheel mechanism 294 functions as a universal joint, it provides little transverse support to the outer end 34 of the second bridge unit 24. In turn, the outer end 34 would tend to be unstable absent additional support. The outer support legs 300 and 306 provide transverse support. The spacing 342 of the right outer support leg 300 and the left outer support leg 306 is sufficient to provide the second end 34 and the bubble 36 with stable transverse support. It is expected that the range of vertical distance 323A for the right outer support leg 300 and the left outer support leg 306 as well as the range of motion 323B for the legs 278 and 282 will typically be about 12 feet each.

In FIGS. 7 and 8 it can be seen that the third telescoping section 30 of the second bridge unit 24 has a roof 268 along with sides 274 and 275 to form an enclosure to interconnect with and to the bubble 36 so that passengers and cargo can move between the second bridge unit transport surface 114 and the bubble transport surface 116. The roof 268 is formed to be integral with the roof 38 of the bubble 36.

Figure 9:
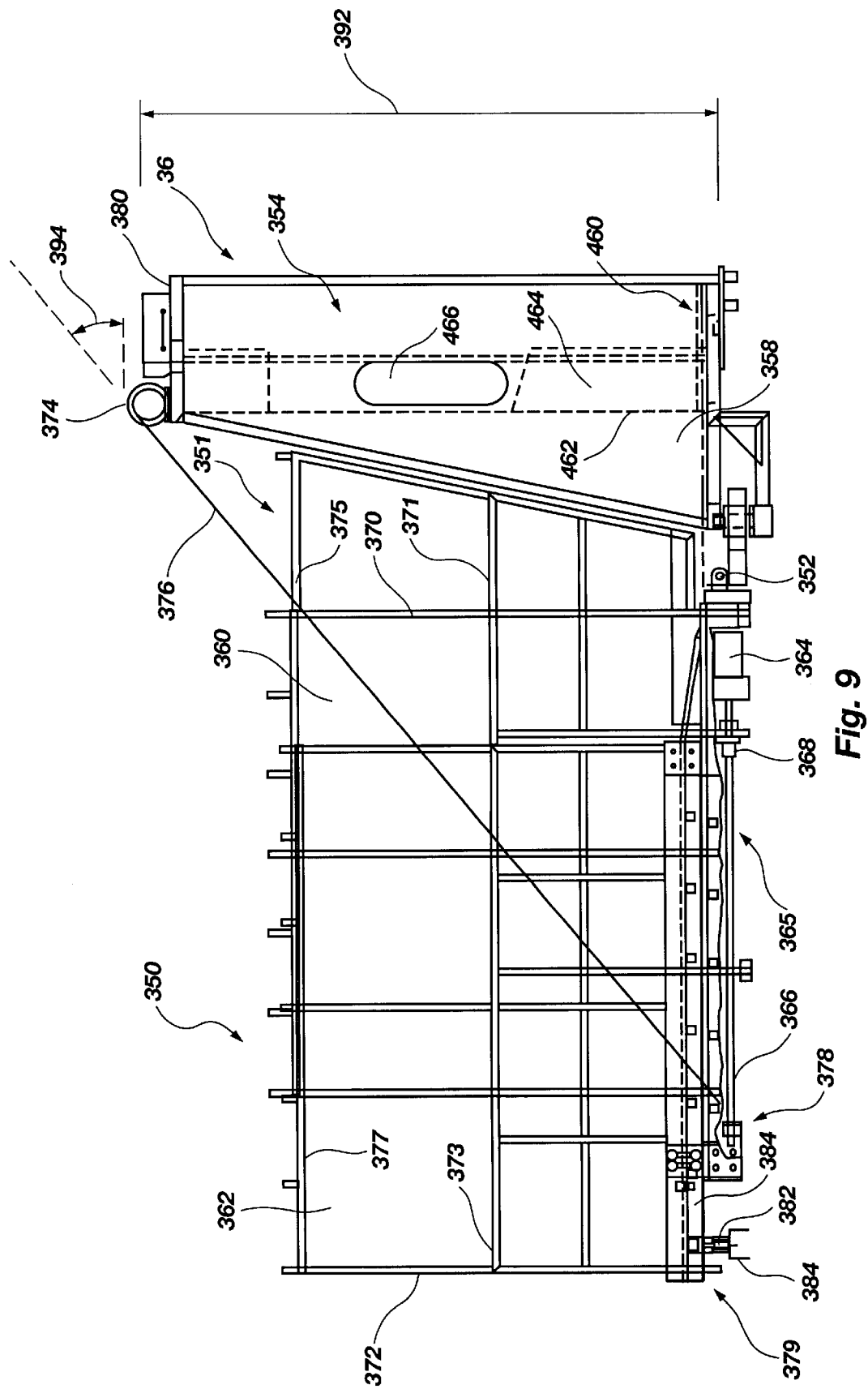
FIG. 9 is a side view of a brow means of the bridge of the present invention.
Figure 10:
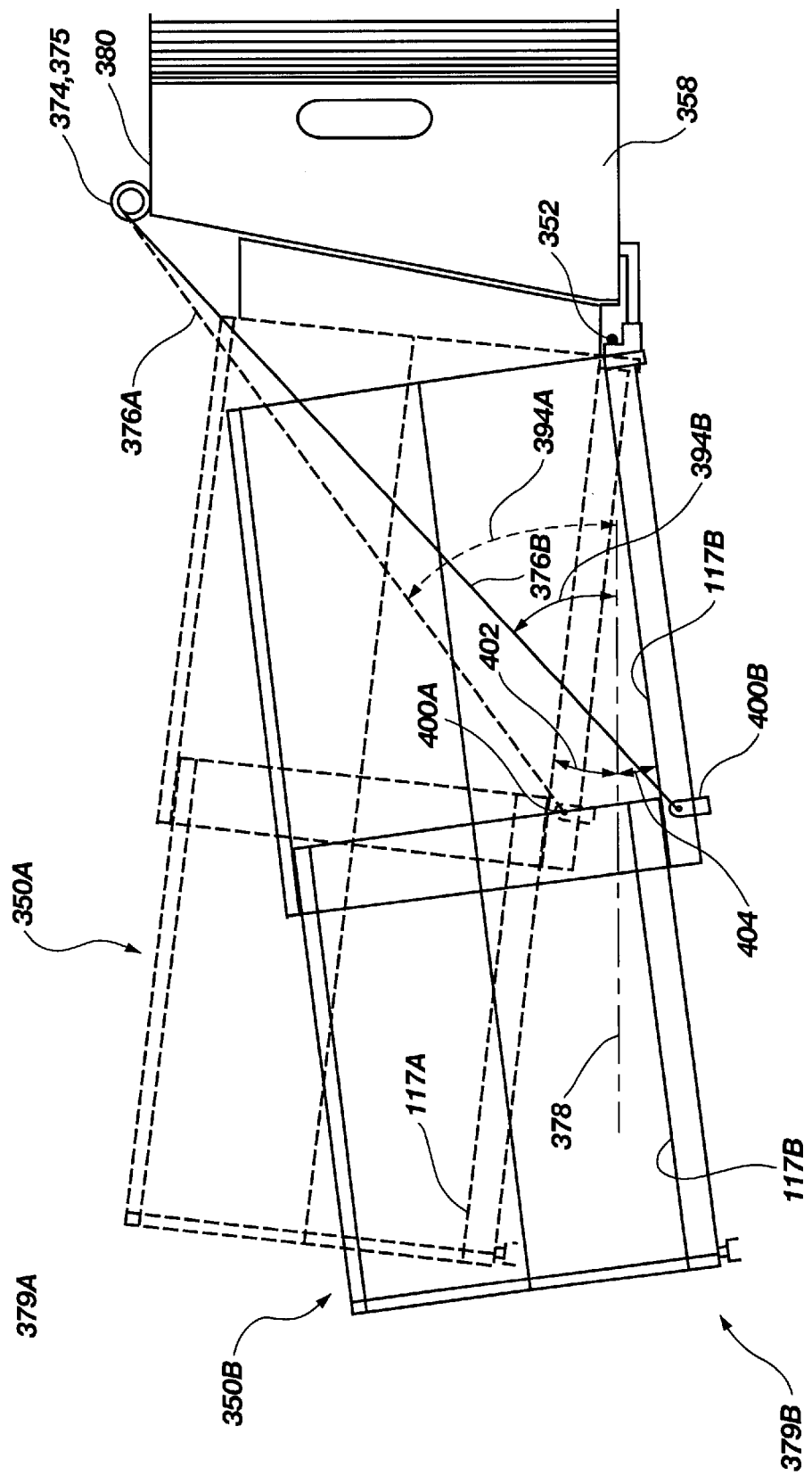
FIG. 10 is a side view depicting the brow means of FIG. 9 in different positions.
Figure 11:
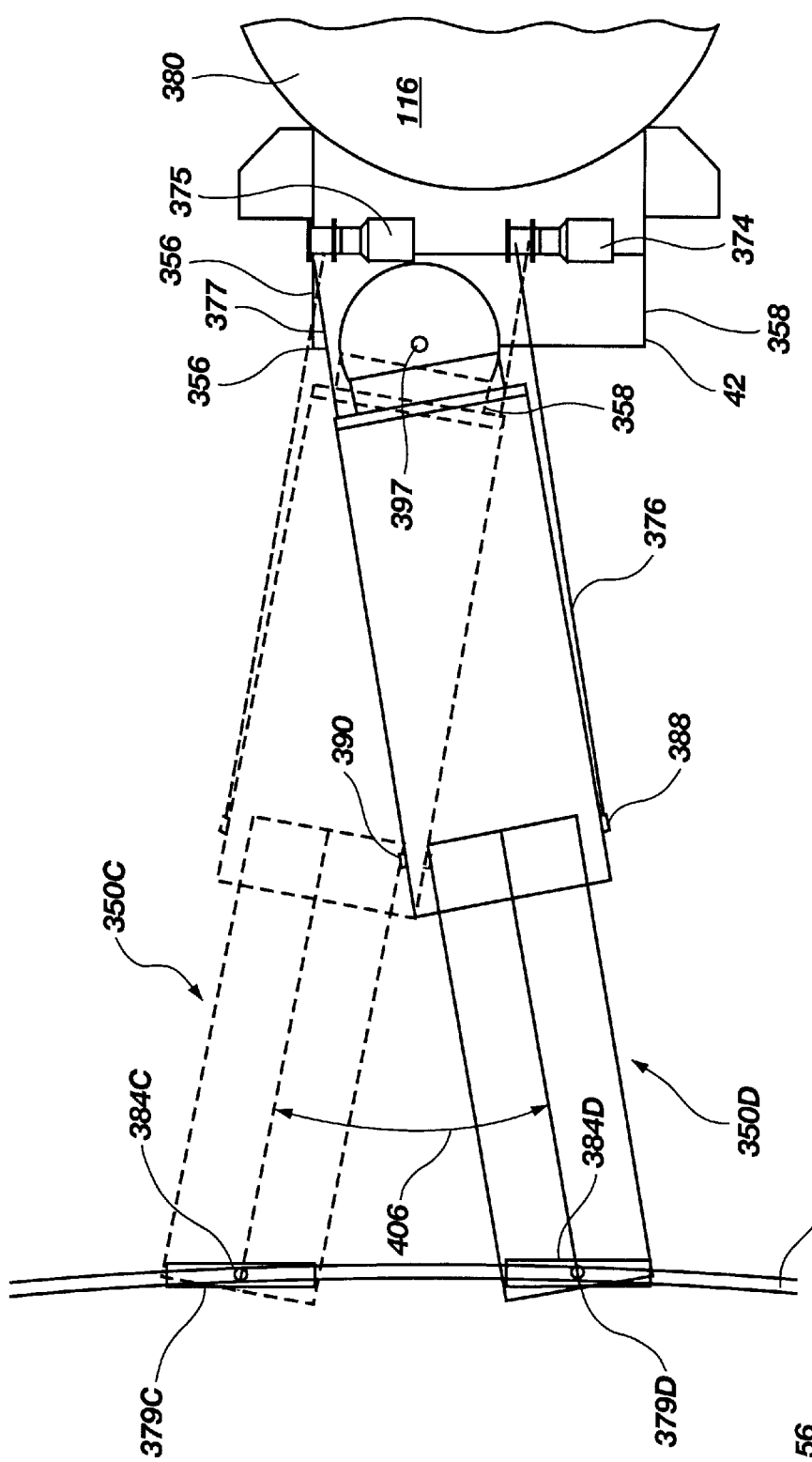
FIG. 11 is a top view depicting the brow means of FIG. 9 in different positions.

As shown in FIG. 3, a brow 40 is secured to the cab 42, which is attached to the bubble 36. FIGS. 9, 10 and 11 depict a suitable and representative brow 350 connected to the cab 42 to rotate vertically about pivot 352. The cab 42 is shown with a portal 354 having cab walls 356 and 358 proximate the inner end 351. The brow 350 has a first section 360 and a second section 362 which telescope. Motor 364 is attached to the underside 365 and arranged to rotate a ball screw 366 through ball nut 368. The motor 364 is reversible in direction so that the ball screw 366 moves the second section 362 inwardly and outwardly relative to the first section 360. Hydraulic alternatives also may be suitable to supply the forces to effect movement in lieu of the motors.

The first section 360 and the second section 362 of the brow 350 are shown with upper frame structures 370 and 372. The first section 360 also has hand rail structure 371 and roof structure 375; and the second section 362 also has a hand rail structure 373 and a roof structure 377. Canvas may be placed over and about the roof structures 375 and 377 as well as along or to the hand rail structures 371 and 373 as desired to provide a roof for protection against the sun and rain as well as a sidewind break.

In use, the brow 350 is rotatable vertically about pivot 352 by two reversible motor and pulley systems 374 and 375 that may be operated by the user to wind and unwind cables 376 and 377. The cables 376 and 377 are connected near the outward end 378 of the first section 360. The motor and pulley systems 374 and 375 are positioned on or near the top of the roof 380 of the cab 42. The difference in height 392 between the motor and pulley systems 374 and 375 and the points 388 and 390 of attachment of the cables 376 and 377 and the angle 394 results in an upward force component for raising and gravity as a downward force component for lowering the outward end 378 of the first section 360 and, in turn, the second section 362. A connecting arrangement is affixed at the outer end 379 of the second section 362. The connecting arrangement includes a "U" shaped bracket 384 connected by a universal joint 382 or similar mechanism. The bracket 384 is sized to hook or connect to the raised edge or scupper rail 386 (FIG. 11) of the side of a ship proximate the passenger transfer area selected for use or to the lip of a side hatch or portal such as hatches or portals 66 and 72.

FIG. 10 is a simplified depiction of the brow 350 in a first position 350A at a selected angular orientation 394A measured relative to the horizontal 398 and a second position 350B at a selected angular orientation 394B measured relative to the horizontal achieved by operation of the motor and pulley systems 374 and 375. As shown, the brow 350 may be oriented between a plurality of positions between and beyond the first position 350A and the second position 350B. The cables 376A and 376B are shown connected at attachment point 388 by pad eyes 400A and 400B.

For use in transferring passengers, the angles 394A and 394B are selected so that the brow transport surface 117A or 117B preferably has a slope of less than about 12 percent above 402 and below 404 the horizontal 398. Of course the motor and pulley systems 374 and 375 may be operated to raise the outer end 379 of second section of the brow 350 to a position in which the cables 376 and 377 are nearly horizontal and the brow transport surface 117A or 117B is substantially upright or vertical.

As better seen in FIG. 11, the brow 350 may be radially positioned between a third position 350C and a fourth position 350D. Radial positioning about axis 397 is desired to allow the outer ends 379C and 379D to be positioned at a desired passenger transfer location on the ship 56. As shown in FIG. 11, the brackets 384C and 384D are shown connecting to the lip of a side port or door of a ship such as transfer ports or doors 66 and 72 (FIG. 2) or to the scupper rail 386 of a ship to provide a firm connection between the ship and the brow. It should be noted, however, that such a connection may not be desired if the ship 56 is undergoing some regular movement. That is, relative movement between the bridge 10 and the ship 56 and more specifically between the brow 40 and in particular brow 350 may be desired in specific circumstances. Although the radial angle 406 between the third position 350C and the fourth position 350D is here shown to be less than 30 degrees, it should be understood that the brow 350 may be moved so that the radial angle 406 may be as much as 30 degrees, if not more.

Figure 17:
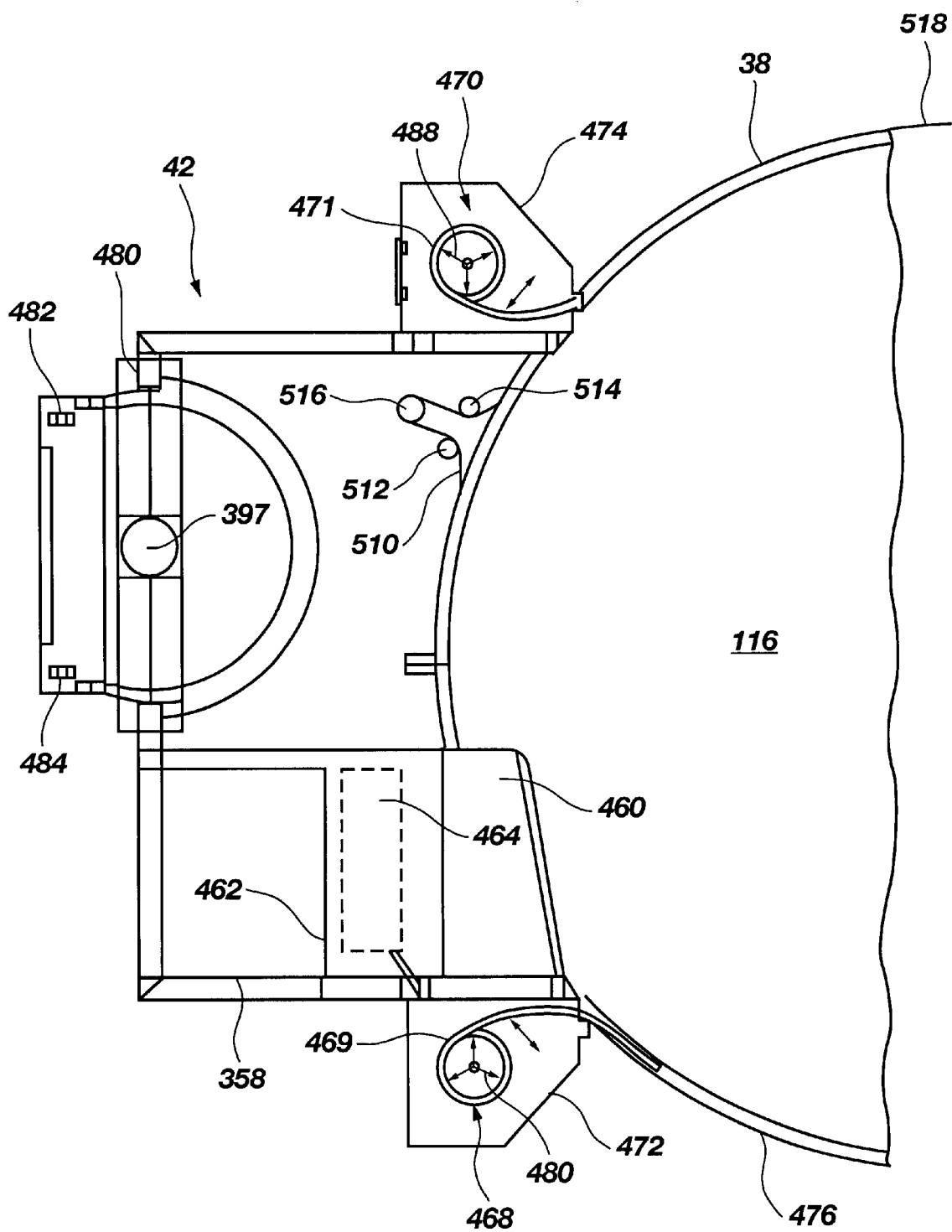
FIG. 17 is a partial top sectional view of the bubble of the bridge of the present invention.

In FIGS. 9 and 17, the cab 42 is shown to have an operator's platform 460 along with skirt 358 and a front 462 to form an enclosure in which control console 464 is positioned. Multiple windows such as windows 466 and 467 (see FIG. 3) are positioned proximate the control console 464 so that an operator may stand on the operator's platform 460 at the console and operate appropriate controls to vary the height of the rotunda 18, the height of the outer end 34 of the second bridge unit 24 and, in turn, the height of the bubble 36 as well as the radial position and the length 44 of the second bridge unit 24 to control the slope of the first bridge unit 14 and the slope of the second bridge unit 24 as well as the position of the bubble 36 relative to the ship. The operator may also operate a motor 516 which drives a chain 510 around idlers 512 and 514. The teeth in the idlers and in a driver from the motor 516 are not shown for clarity. The chain 510 extends around a substantial portion of the circumference of the bubble 36 and is secured to the bubble 36 at its opposite ends like end 518. With the motor 516 mounted to the cab 42, its operation causes the teeth of the driver being rotated by the motor 516 to engage the chain 510 and move the cab 42 and, in turn, move the brow 40 relative to the bubble 36. The operator may also operate the motors 374, 375 and 364, or a suitable hydraulic alternative, to position the outer end 379 of second section 362 of brow 350 as desired on the ship 56.

FIGS. 12 and 13 show an alternate form of a brow 410 which has three sections 412, 414 and 416. Sections 412 and 416 telescope to change the length 418 between the pivot point 420 and the outer end 422 of the brow 410. The brow 410 is shown with a canvass roof 424 and a canvas-covered area 426 below hand rail 428.

FIG. 17 is a planar top view of the bubble 36 showing the operator's platform 460 and the control console 464 positioned with sidewall mechanisms 468 and 470 positioned on the platforms 472 and 474. The cab 42 is mounted to the section 38 to move thereabout on a track or rail 476 propelled by the motor 516 and chain 510 as hereinbefore discussed. The axis 397 can be seen with a rotating section 480 of the brow such as brow 350 configured with pivot supports 482 and 484 to which the first section such as first section 360 is rotatably secured.

The sidewall mechanisms 468 and 470 include a plurality of pleats or slats formed of any suitable metal (e.g., galvanized metal, aluminum) to extend substantially the height from the bubble transport surface 116 to the roof 38 of the bubble 36. The pleats or slats all rotate relative to each other and wind up on spindles 486 and 488 much like a window shade. Thus, as the cab 42 moves about the bubble 36, slats 469 and 471 wind up on one side and pay out on the other to maintain a walled interior for the bubble 36. That is, the pleats or slats of the wall extend around and are secured at an appropriate location to the bubble 36 and more specifically to fixed sidewalls of the bubble 36 or the fixed sidewalls (e.g., wall 274) of third section 30 of the second bridge unit 24.

In operation, the driving system 32 and the elevation system 20, fixed in location, may be operated separately to achieve a desired slope for passenger transport surface 108 of the first bridge unit 14 and the passenger transport surface 114 of the second bridge unit 24. The selected slope may vary from one bridge unit 14 to the other 24. The slope is controlled to be less than about 12 percent and preferably less than 8.33 percent to facilitate foot movement and wheelchair movement while at the same time providing the bubble 36 and the second end 34 of the second bridge unit 24 with a substantial range of vertical motion. With a substantial range of vertical motion associated with the outer end of a telescoping second bridge unit, with a telescoping brow and with a second bridge unit and a brow that moves radially, the brow 40 and more particularly its outer end may be positioned for the transfer of passengers at a desired passenger transfer area of and on a wide range of vehicles such as ships and more particularly oceangoing cruise ships.

The bridge 10 may be made in different sizes to accommodate different terminal and pier configurations without departing from the principles of the invention. Mechanical features and details of the bridge 10 not discussed in detail are believed to be within the ability of those skilled in the art.

Reference herein to details of the illustrated embodiments is not intended to restrict the scope of the appended claims, which themselves recite those features which are regarded as essential to the invention.

What is claimed is:

1. A bridge for movement of passengers between a location at a passenger terminal having multiple levels therein and a passenger transfer location on a vehicle, said passenger transfer location varying in height between a first level and a second level, said bridge comprising:

a vestibule for attachment to an elevated level of a passenger terminal having multiple levels including a ground level and the elevated level spaced above the ground level, said vestibule having a vestibule transport surface extending away from the passenger terminal and being positionable for transfer of passengers between said vestibule transport surface and the elevated level;

a first bridge unit having a first end and a second end, said first bridge unit being movably attached to said vestibule proximate said first end thereof to be positionable to a selected one of a plurality of first bridge unit positions, said first bridge unit having a first transport surface extending substantially between said first end and said second end thereof, said first end of said first transport surface being positioned proximate said vestibule transport surface for transfer of passengers between said first transport surface and said vestibule transport surface;

a rotunda assembly having said second end of said first bridge unit rotatably attached thereto, said rotunda assembly having a rotunda transport surface positioned for transfer of passengers between said first transport surface and said rotunda transport surface;

elevation structure attached to said rotunda assembly for moving said rotunda assembly to one of a plurality of rotunda positions relative to and above said ground level;

a second bridge unit having a first end and a second end, said first end thereof being rotatably attached to said rotunda assembly for movement of said second bridge unit to a selected one of a plurality of second bridge unit positions, said second bridge unit having a second transport surface extending substantially between said first end and said second end thereof, said second transport surface being positioned for transfer of passengers between said rotunda transport surface and said second transport surface;

a driving mechanism attached to and positioned proximate said second end of said second bridge unit for moving said second end of said second bridge unit to a selected one of said plurality of second bridge unit positions between a lower position and an elevated position above said ground level and for moving said second bridge unit radially about said rotunda assembly; and brow structure for transferring passengers between said second bridge unit and said vehicle, said brow structure having a first end, a second end and a brow transport surface extending substantially therebetween, said first end of said brow structure being connected proximate said second end of said second bridge unit for transfer of passengers between the second transport surface and the brow transport surface, and said second end of said brow structure being configured to contact said vehicle proximate said passenger transfer location for transfer of passengers between said brow transport surface and said vehicle;

said elevation structure attached to said rotunda assembly and said driving mechanism being operable for moving said rotunda assembly, said first bridge unit and said second bridge unit relative to each other to position said first end of said brow structure between a first level and a second level spaced above said first level.

2. The bridge of claim 1 wherein said first level is ground level.

3. The bridge of claim 1 wherein said vestibule transport surface is substantially horizontal.

4. The bridge of claim 3 wherein said vestibule has a vertical support extending from a support surface to said vestibule and positioned to vertically support said vestibule.

5. The bridge of claim 1 wherein said first bridge unit moves relative to said vestibule between a first bridge unit first position in which said first transport surface is at a first angle to extend downwardly below horizontal and a first bridge unit second position in which said first transport surface is at a second angle to extend upwardly above horizontal.

6. The bridge of claim 5 wherein said elevation structure is operable to move said rotunda assembly between a rotunda first position in which said first bridge unit is in its first bridge unit first position and a rotunda second position in which said first bridge unit is at its first bridge unit second position.

7. The bridge of claim 6 wherein said first angle and said second angle are each selected to provide for an inclination and a declination from about 0 to about 12 percent.

8. The bridge of claim 6 wherein said first angle and said second angle are each selected to provide for an inclination and a declination from about 0 to about 8.33 percent.

9. The bridge of claim 6 wherein said rotunda assembly has a fixed portion and a rotating portion, said fixed portion having a first portal with said second end of said first bridge unit rotatably attached proximate thereto, said rotating portion being connected to said fixed portion with said rotunda transport surface extending between and into said rotating portion and said fixed portion, said rotating portion having a second portal with said second bridge unit rotatably attached proximate thereto, and said second portal being configured for radial movement relative to said first portal.

10. The bridge of claim 9 wherein said rotunda assembly is configured for movement of said second portal rotationally relative to said first portal.

11. The bridge of claim 10 wherein said rotating portion has a vertical axis of rotation and wherein said rotating portion rotates about said vertical axis of rotation.

12. The bridge of claim 11 wherein said second bridge unit rotates between a second bridge unit first position in which said second transport surface extends downwardly at a third angle below the horizontal and a second bridge unit second position in which said second transport surface extends upwardly at a fourth angle above the horizontal.

13. The bridge of claim 12 wherein said third angle and said fourth angle are each selected to provide for an inclination and a declination from about 0 to about 12 percent.

14. The bridge of claim 12 wherein said third angle and said fourth angle are each selected to provide for an inclination and a declination from about 0 to about 8.33 percent.

15. The bridge of claim 12 wherein said driving mechanism includes vertical movement structure for moving said second end of said second bridge unit between said second bridge unit first position and said second bridge unit second position.

16. The bridge of claim 15 further including a bubble attached to said second end of said second bridge unit, said bubble having a bubble transport surface positioned for transfer of passengers between said second transport surface and said bubble transport surface and for transfer of passengers between said bubble transport surface and said brow transport surface.

17. The bridge of claim 16 wherein said bubble has a cab section attached thereto to move about said bubble, wherein said second bridge unit includes a first telescoping section and a second telescoping section connected to said first telescoping section for telescoping movement therebetween, and wherein said driving mechanism is operable to telescopically move said first telescoping section relative to said second telescoping section.

18. The bridge of claim 17 wherein said second bridge unit includes a third telescoping section connected to said second telescoping section for telescoping movement therebetween and wherein said driving mechanism is operable to move said third telescoping section relative to said second telescoping section.

19. The bridge of claim 18 wherein said driving mechanism moves said second bridge unit between a first radial position and a second radial position, said first radial position and said second radial position being from about 90 degrees to about 180 degrees apart.

20. The bridge of claim 19 wherein said first section of said brow structure has a first end and a second end and said second section of said brow structure has a first end and a second end, wherein said first end of said first section of said brow structure is rotatably connected to said cab and said second end of said first section of said brow structure is telescopingly connected to said first end of said second section of said brow.

21. The bridge of claim 18 wherein said brow structure includes a first section and a second section telescopically connected to said first section.

22. The bridge of claim 18 wherein said driving mechanism includes horizontal movement structure attached to said vertical movement structure.

23. The bridge of claim 22 wherein said vestibule, said first bridge unit, said rotunda assembly, said second bridge unit and said bubble are each configured with a roof.

24. The bridge of claim 23 wherein said vestibule, said first bridge unit, said rotunda assembly, said second bridge unit and said bubble are each configured with sidewalls.

25. The bridge of claim 24 wherein said brow structure has a roof.

26. The bridge of claim 25 wherein said brow structure is rotatably attached to said cab to be movable about a third pivot between a fifth angle below the horizontal and a sixth angle above the horizontal.

27. The bridge of claim 26 wherein said fifth angle and said sixth angle are each selected to provide for an inclination and a declination from about zero to about twelve percent.

28. The bridge of claim 27 wherein said second end of said brow structure is configured for attachment to said vehicle.

29. The bridge of claim 28 wherein said vehicle is a ship.

30. A bridge for movement of passengers between a location at a passenger terminal having multiple levels therein and a passenger transfer location on a ship, said passenger transfer location varying in height between a first level and a maximum level, said bridge comprising:

a vestibule for attachment to an elevated level of a passenger terminal having multiple levels including a ground level and said elevated level spaced above said ground level, said vestibule having a vestibule transport surface extending away from said passenger terminal and being positionable for transfer of passengers between said vestibule transport surface and the elevated level;

a first bridge unit having a first end and a second end, said first bridge unit being movably attached to said vestibule proximate said first end thereof to be movable to a selected one of a plurality of first bridge unit positions, said first bridge unit having a first transport surface extending between said first end and said second end thereof, said first end being positioned proximate said vestibule transport surface for transfer of passengers between said first transport surface and said vestibule transport surface;

a rotunda assembly having said second end of said first bridge unit rotatably attached thereto, said rotunda assembly having a rotunda transport surface positioned for transfer of passengers between said first transport surface and said rotunda transport surface;

elevation structure attached to said rotunda assembly for moving said rotunda assembly to one of a plurality of rotunda positions relative to and above said ground level;

a second bridge unit having a first end and a second end, said first end thereof being rotatably attached to said rotunda assembly for movement of said second bridge unit to a selected one of a plurality of second bridge unit positions, said second bridge unit having a second transport surface extending between said first end and said second end thereof, said second transport surface being positioned for transfer of passengers between said rotunda transport surface and second transport surface;

driving mechanism attached to and positioned proximate said second end of said second bridge unit for moving said second end of said second bridge unit to a selected one of a plurality of positions between a lower position and an elevated position above said ground level and for moving said second bridge unit radially relative to said second end of said first bridge unit; and brow structure for transferring passengers between said second bridge unit and said ship, said brow structure having a first end, a second end and a brow transport surface extending substantially therebetween, said first end of said brow structure being connected proximate said second end of said second bridge unit for transfer of passengers between said second transport surface and said brow transport surface, and said second end of said brow structure being configured to contact said ship proximate said passenger transfer location for transfer of passengers between said brow transport surface and said ship;

wherein said elevation structure attached to said rotunda assembly and said driving mechanism is operable for moving said rotunda assembly, said first bridge unit and said second bridge unit relative to each other to position said brow structure between a first level and a maximum level spaced above said maximum level of said passenger transfer location.

31. A bridge for movement of passengers between a location at a passenger terminal having an elevated level therein and a passenger transfer location on a ship, said passenger transfer location varying in height between a first level and a maximum level, said bridge comprising:

a vestibule for attachment to an elevated level of a passenger terminal having an elevated level, said vestibule having a vestibule transport surface extending substantially horizontally away from said passenger terminal and being positionable for transfer of passengers between said vestibule transport surface and the elevated level;

a first bridge unit having a first end and a second end, said first bridge unit being movably attached to said vestibule proximate said first end thereof to be movable to a selected one of a plurality of first bridge unit positions between a first bridge unit first position in which said first bridge unit is at a first angle below the horizontal and a first bridge unit second position in which the first bridge unit is at a second angle above the horizontal, said first bridge unit having a first transport surface extending between said first end and said second end thereof, said first end being positioned proximate said vestibule transport surface for transfer of passengers between said first transport surface and said vestibule transport surface;

a rotunda assembly having said second end of said first bridge unit rotatably attached thereto, said rotunda assembly having a rotunda transport surface positioned for transfer of passengers between said first transport surface and said rotunda transport surface, said rotunda assembly having a fixed portion with a first portal having said second end of said first bridge unit rotatably attached proximate thereto and a rotating portion connected to said fixed portion with said rotunda transport surface extending between and into said rotating portion and said fixed portion, said rotating portion having a second portal configured for radial movement relative to said first portal;

elevation structure attached to said rotunda assembly for moving said rotunda assembly to one of a plurality of rotunda positions relative to and above said ground level to move said first bridge unit between said first bridge unit first position and said first bridge unit second position;

a second bridge unit having a first end and a second end and having a plurality of sections telescopically connected to each other, said first end of said second bridge unit being rotatably attached to said rotunda assembly for movement of said second bridge unit to a selected one of a plurality of second bridge unit positions between a second bridge unit first position in which said second bridge unit extends downwardly at a third angle below the horizontal and a second bridge unit second position in which said second bridge unit extends upwardly at a fourth angle above the horizontal, said second bridge unit having a second transport surface extending between said first end and said second end thereof, said second transport surface being positioned for transfer of passengers between said rotunda transport surface and second transport surface;

a bubble with a bubble transport surface positioned for transfer of passengers between said second transport surface and said bubble transport surface, said bubble having a fixed section with a bridge portal formed therein having said second end of said second bridge unit being rotatably secured proximate thereto, and said bubble having a cab connected to said fixed section to rotate relative thereto and said rotating section of said bubble including a brow portal;

a driving mechanism attached proximate said second end of said second bridge unit for moving said bubble and said second end of said second bridge unit to a selected one of a plurality of positions between a lower position and an elevated position above said ground level and for moving said second bridge unit radially and telescopically relative to said rotunda assembly;

brow structure for transferring passengers between said second bridge unit and said ship, said brow structure having a first end, a second end and a brow transport surface extending substantially therebetween, said first end of said brow structure being connected proximate said brow portal for transfer of passengers between the second transport surface and said brow transport surface, and said second end of said brow structure being configured to contact said ship proximate a passenger transfer location for transfer of passengers between said brow transport surface and said ship;

wherein said elevation structure attached to said rotunda assembly and said driving mechanism is operable for moving said first bridge unit and said second bridge unit relative to each other to position said brow structure between a first level and a maximum level spaced above said maximum level of said passenger transfer location.

* * * * *